United States Patent
Moon et al.

(10) Patent No.: US 6,879,361 B2
(45) Date of Patent: Apr. 12, 2005

(54) TRANSREFLECTIVE LIQUID CRYSTAL DISPLAY AND METHOD OF MANUFACTURING THE SAME

(75) Inventors: Kook-Chul Moon, Suwon-si (KR); Joo-Sun Yoon, Seoul (KR); Pil-Mo Choi, Seoul (KR); Yong-Ho Yang, Seoul (KR); Yang-Suk Ahn, Yongin-si (KR); Hong-Gyun Kim, Suwon-si (KR); Young-Nam Yon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/150,190

(22) Filed: May 17, 2002

(65) Prior Publication Data
US 2003/0025859 A1 Feb. 6, 2003

(30) Foreign Application Priority Data

| Aug. 1, 2001 | (KR) | 2001-46648 |
| Dec. 18, 2001 | (KR) | 2001-80713 |
| Jan. 11, 2002 | (KR) | 2002-1803 |

(51) Int. Cl.$^7$ .......................................... G02F 1/1343
(52) U.S. Cl. ............................. 349/114; 349/38; 349/39
(58) Field of Search ............................... 349/38, 39, 114

(56) References Cited

U.S. PATENT DOCUMENTS

| 4,704,002 A | * | 11/1987 | Kikuchi et al. ................ 349/43 |
| 6,057,896 A | * | 5/2000 | Rho et al. ....................... 349/42 |
| 6,195,140 B1 | | 2/2001 | Kubo et al. |
| 6,281,952 B1 | * | 8/2001 | Okamoto et al. .............. 349/12 |
| 6,466,280 B1 | * | 10/2002 | Park et al. ...................... 349/43 |
| 6,501,519 B2 | * | 12/2002 | Ha et al. ......................... 349/43 |
| 6,519,014 B2 | * | 2/2003 | Ha .................................. 349/43 |
| 6,532,045 B2 | * | 3/2003 | Chung et al. ................. 349/43 |
| 6,657,688 B2 | * | 12/2003 | Nagata et al. ............... 349/113 |

FOREIGN PATENT DOCUMENTS

| JP | 2001-272674 | 10/2001 |
| JP | 2001-281662 | 10/2001 |
| JP | 2001-350158 | 12/2001 |
| WO | WO99/28782 | 6/1999 |

OTHER PUBLICATIONS

International Search Report PCT/KR02/01221; Oct. 4, 2002.

* cited by examiner

*Primary Examiner*—Andrew Schechter
(74) *Attorney, Agent, or Firm*—Cantor Colburn LLP

(57) ABSTRACT

Disclosed are a transreflective type LCD, a method of manufacturing the same and a method of thin film transistor thereof. A TFT and a pixel electrode connected with a drain electrode of the TFT are formed on a TFT substrate. The pixel electrode includes a reflective electrode for reflecting a first light from an external and a transmissive electrode for transmitting a second light generated in the transreflective type LCD. The reflective electrode is formed to have a size no more than a size of an area in which the reflective electrode is not overlapped with the transmissive electrode. Thus, visual differences between the reflective and the transmissive modes are reduced. Also, the reflective electrode for reflecting the first light is formed with the TFT through one process, thereby reducing the number of manufacturing processes of the transreflective type LCD and the thickness thereof.

14 Claims, 27 Drawing Sheets

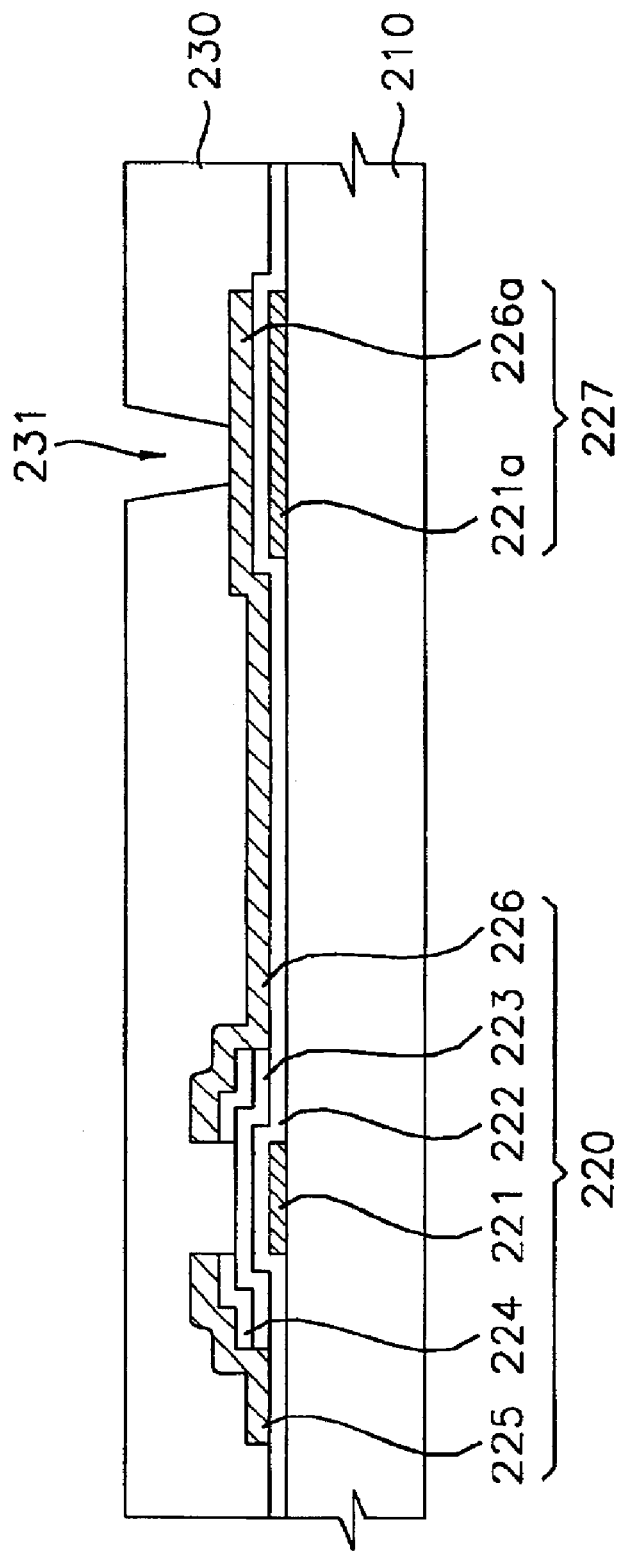

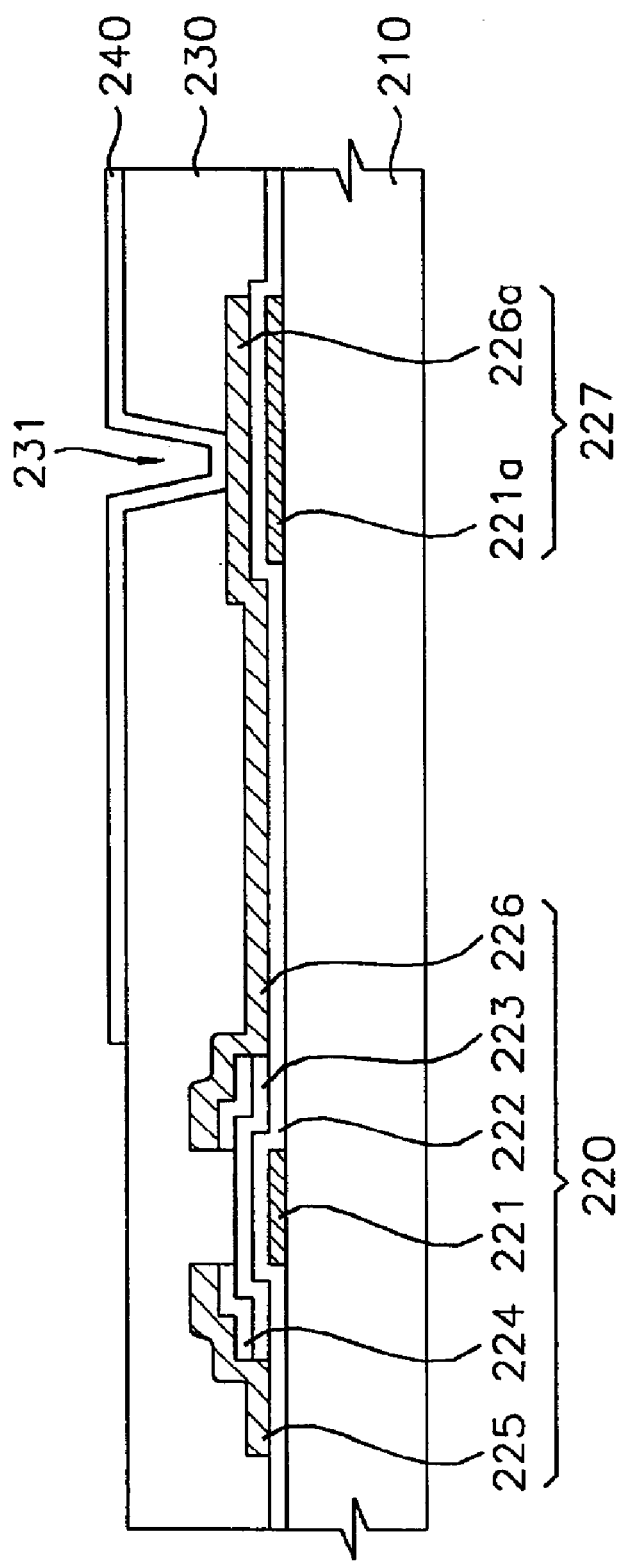

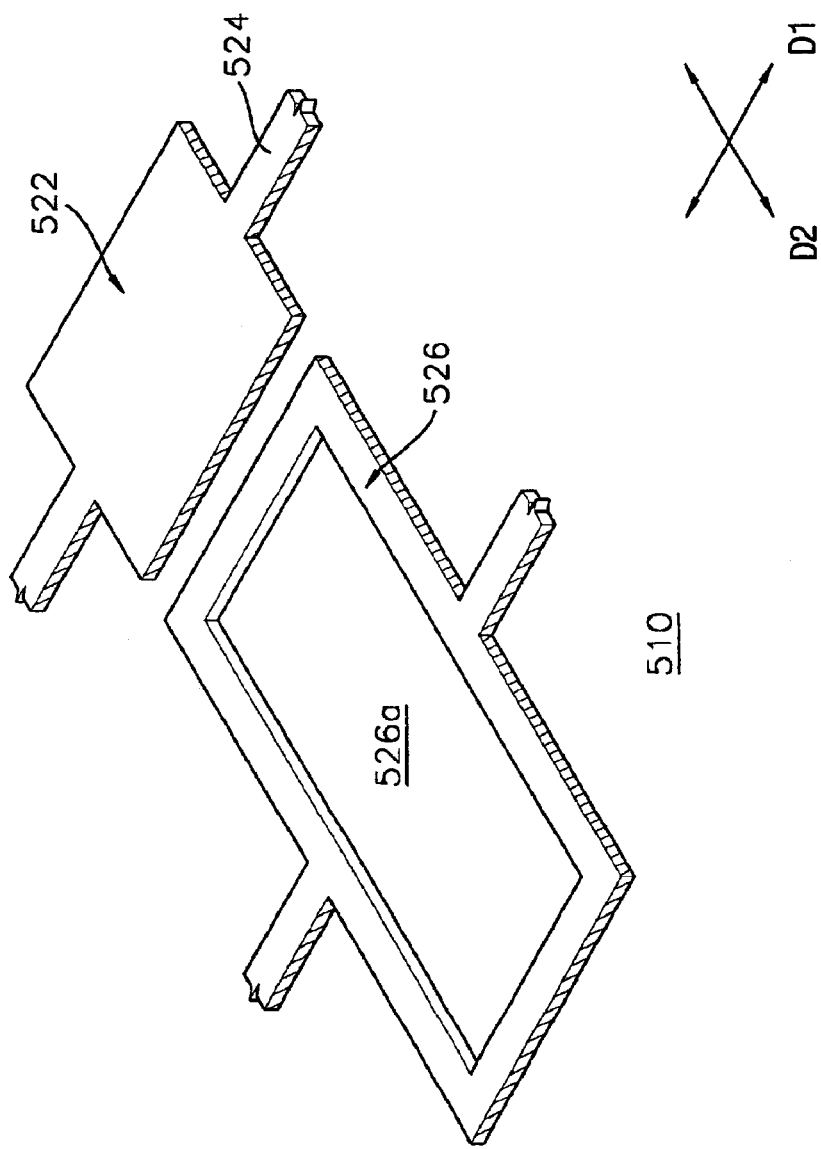

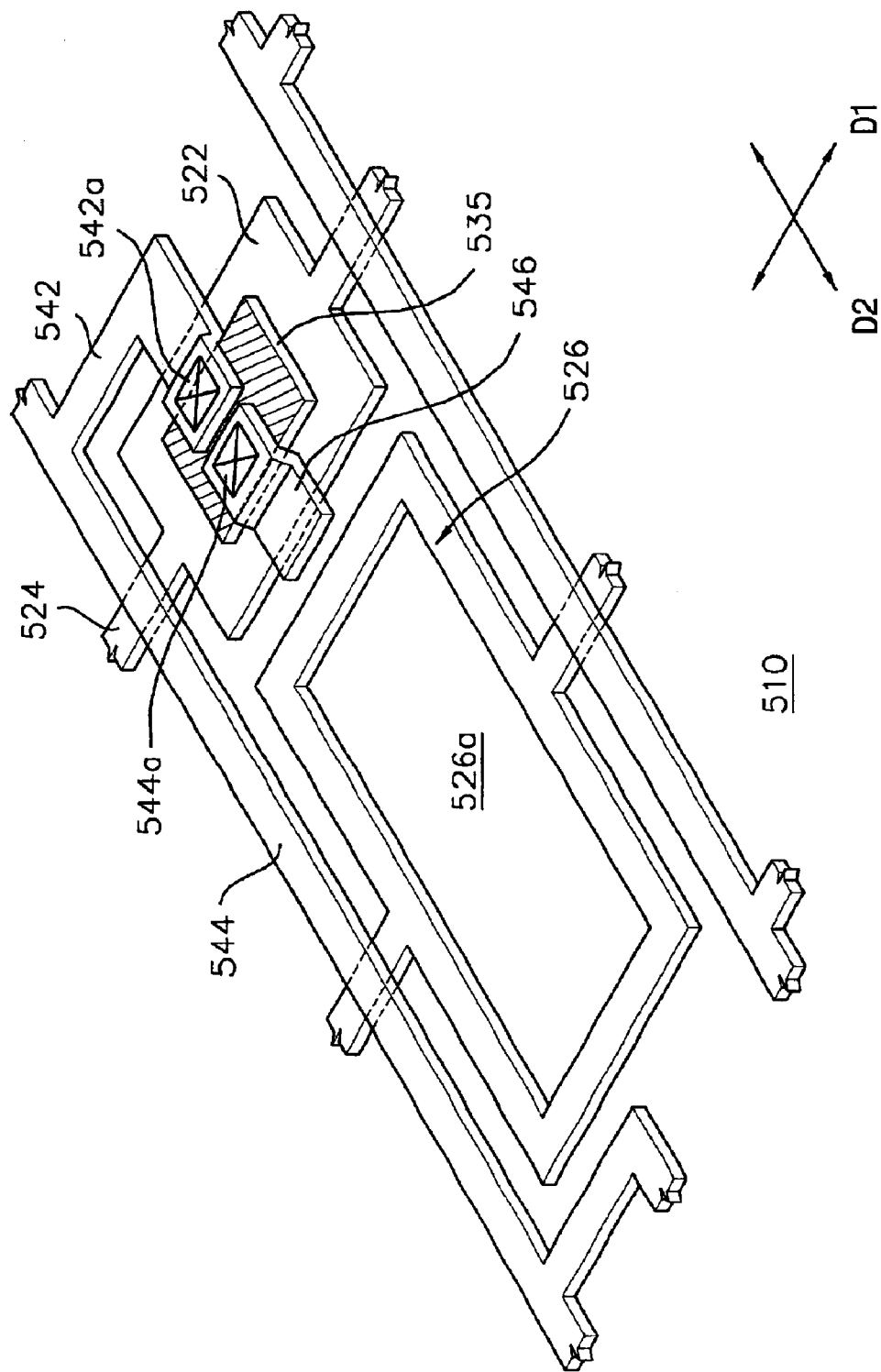

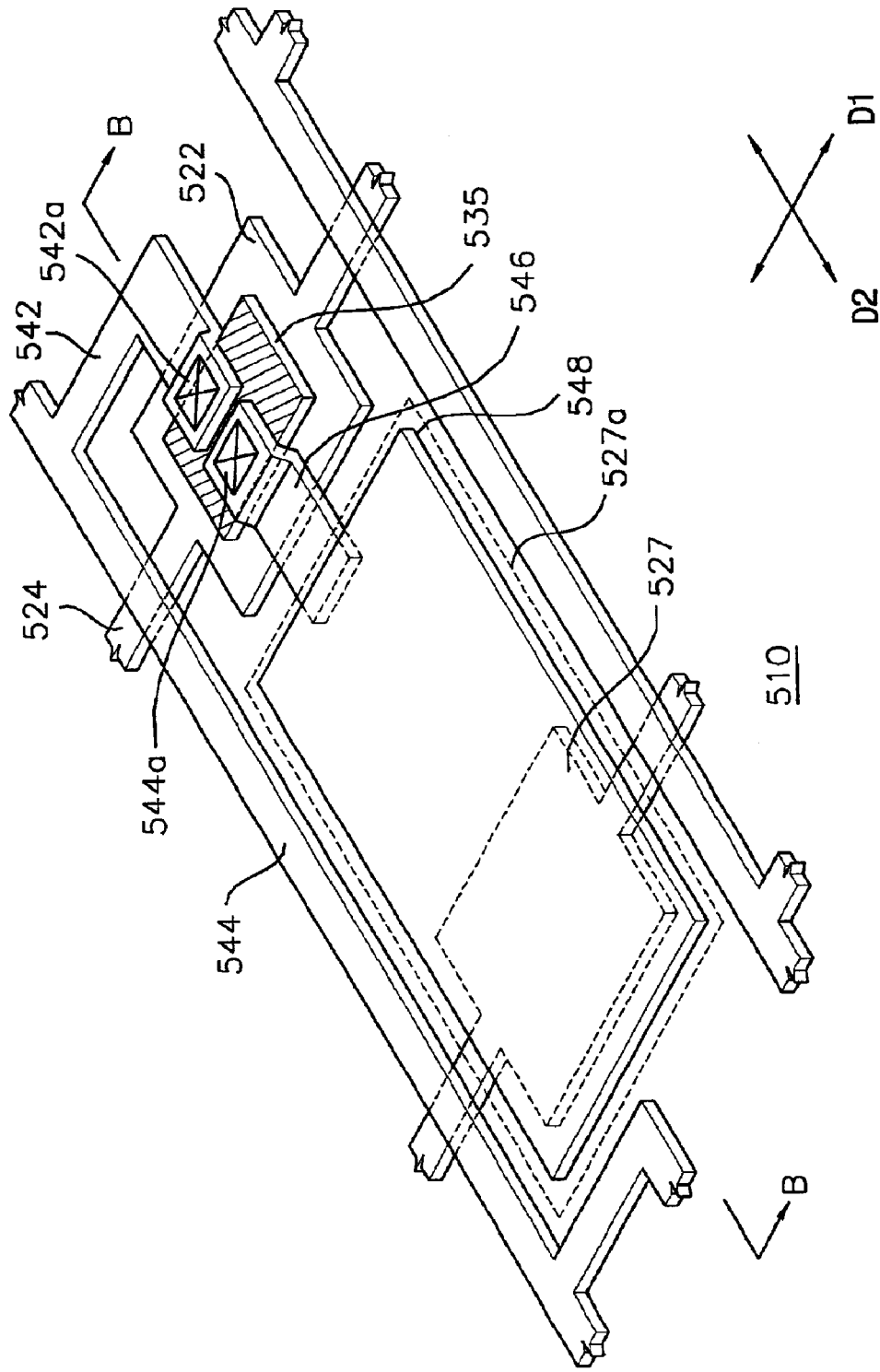

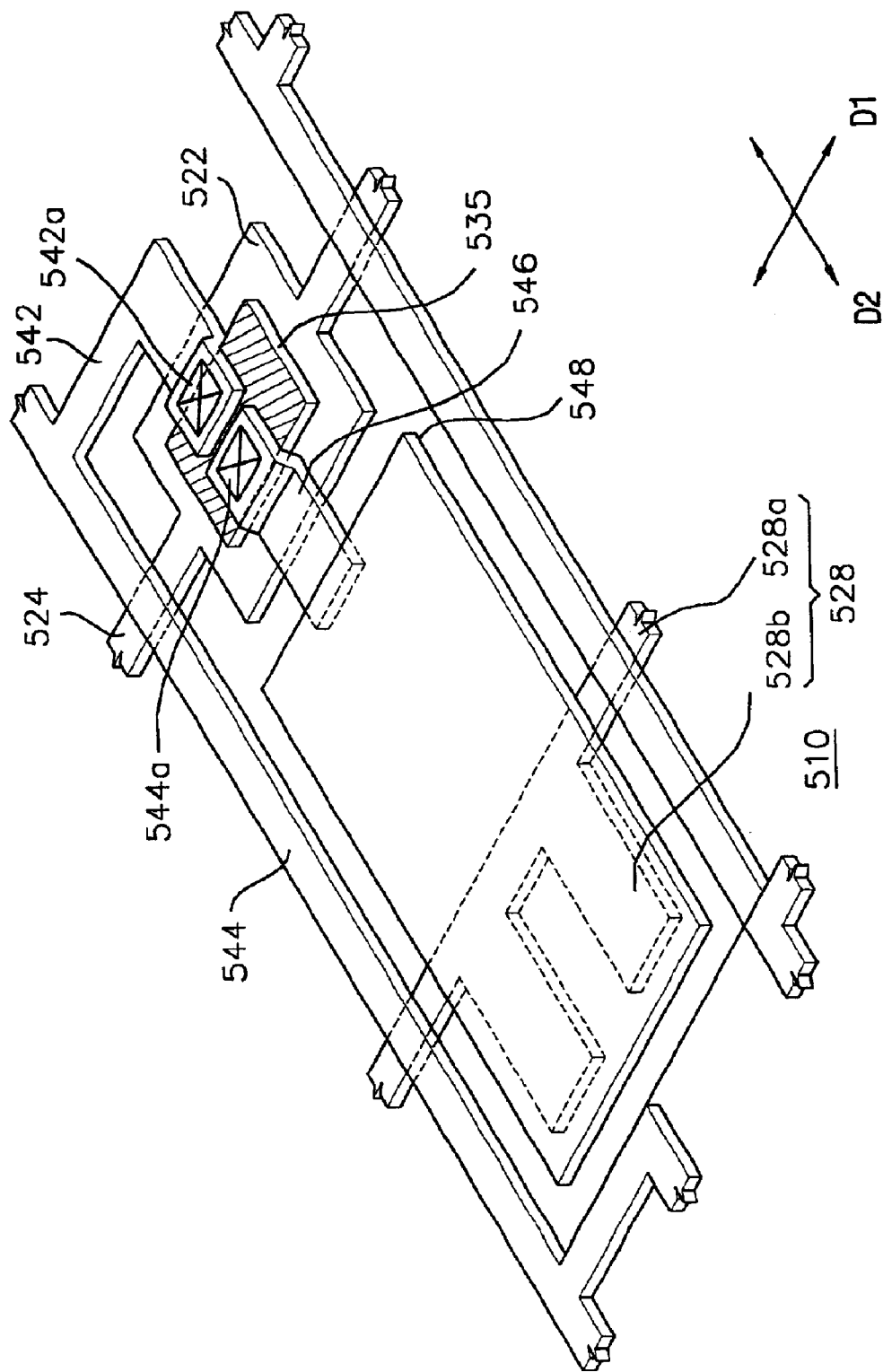

TRANSREFLECTIVE LIQUID CRYSTAL DISPLAY AND METHOD OF MANUFACTURING THE SAME

BACKGROUND OF THE INVENTION

1. Field of the Invention

The present invention relates to a liquid crystal display (LCD), and more particularly to a transreflective type LCD and a method of manufacturing the same.

2. Description of the Related Art

In the so-called information society of these days, electronic display devices are important as information transmission media and various electronic display devices are widely applied to industrial apparatus or home appliances. Recently, demand has increased for a new electronic display device such as an LCD having characteristics such as thin thickness, light weight, low driving voltage and low power consumption. Manufacturing of such LCD has been improved due to advances in semiconductor technology.

The LCD is classified as a reflective type LCD that displays an image using a first light provided from an external, a transmissive type LCD that displays an image using a second light generated by a light generating means installed therein, and a transreflective type LCD that displays an image using either the first light or the second light. The transreflective type LCD displays the image using the first light where an amount of the first light is enough to display the image and displays the image using the second light generated by consuming electricity charged therein where the amount of the first light is not enough to display the image. Thus, the transreflective type LCD reflects the first light and transmits the second light.

FIG. 1 is a plan view showing a unit pixel of a conventional transreflective type LCD. The transreflective type LCD includes a thin film transistor (TFT) substrate (not shown), a color filter substrate (not shown) and a liquid crystal (not shown) interposed between the TFT substrate and the color filter substrate. The color filter substrate faces the TFT substrate and includes RGB color pixels and a common electrode formed over the RGB color pixels.

Referring to FIG. 1, a unit pixel 50 formed on the TFT substrate of the transreflective type LCD includes a TFT 20 and a pixel electrode 10. The TFT substrate includes a plurality of data lines 31 arranged in a row direction and a plurality of gate lines 32 arranged in a column direction. Particularly, the TFT 20 includes a gate electrode 21, a source electrode 22 and a drain electrode 23. The gate electrode 21 is commonly connected to a plurality of gate lines 32 in the column direction, the source electrode 22 is commonly connected to a plurality to data lines 31 in the row direction, and the drain electrode 23 is connected to the pixel electrode 10.

The pixel electrode 10 includes a reflective electrode 12 for displaying the image by reflecting the first light and a transmissive electrode 11 for displaying the image by transmitting the second light. That is, the transmissive electrode 11 is formed to be connected with the drain electrode 23 of the TFT, and the reflective electrode 12 having a transmissive window 13 is formed on the transmissive electrode 11 to expose a portion of the transmissive electrode 11. Thus, where an amount of an external light is enough to display the image, the unit pixel 50 displays the image in a reflective mode in which the reflective electrode reflects the external light. Where the amount of the external light is not enough to display the image, the unit pixel 50 displays the image in a transmissive mode in which a light generated by a light generating means is transmitted through the transmissive electrode 11 exposed by the transmissive window 13.

In FIG. 1, reference characters "A" and "2A" represent an area (second area) of the transmissive window 13, and an area (first area) of the reflective electrode 12, respectively. Accordingly, an area of the transmissive electrode 11 exposed by the transmissive window 13 is the same as "A". The area "A" of the transmissive electrode exposed by the transmissive window is less than the area "2A" of the reflective electrode 12. Therefore, the transreflective type LCD displays the image in the reflective mode, and further, displays the image in the transmissive mode when the external light is not enough to display the image, thereby reducing a power consumption for generating the light.

However, since the first area "2A" is greater than the second area "A", there is a brightness difference between the reflective mode and the transmissive mode. A brightness in the reflective mode is higher than that in the transmissive mode. If the amount of the second light increases to compensate the brightness difference, the power consumption increases.

Also, in spite of forming the reflective electrode 12 to have the first area "2A" greater than the second area "A" of the transmissive electrode 11 exposed by the transmissive window 13, the first light passes through the color filter substrate at least twice in the reflective mode. In the reflective mode, the first light is incident through the color filter substrate, and then the first light is emitted through the color filter substrate after being reflected by the reflecting electrode 12. This inevitably results in a difference in a color reproducibility between the reflective and transmissive modes.

BRIEF SUMMARY OF THE INVENTION

The present invention provides a transreflective type LCD for reducing a visual difference between a transmissive mode and a reflective mode.

The present invention also provides a transreflective type LCD for reducing a thickness thereof.

The present invention provides a method of manufacturing a thin film transistor substrate for a transreflective type LCD.

The present invention provides a method of manufacturing a transreflective type LCD for reducing a visual difference between a transmissive mode and a reflective mode.

In one aspect of the invention, there is provided a transreflective type LCD displaying an image in a transmissive mode and in a reflective mode, the LCD comprising: a first substrate having a thin film transistor on which a gate electrode, a data electrode and a drain electrode are formed, a transmissive electrode formed in the first substrate and connected to the drain electrode, and a reflective electrode having a first area and a transmissive window having a second area to expose the transmissive electrode; a second substrate having a common electrode and facing the first substrate; and a liquid crystal interposed between the first and second substrates; wherein the second area is larger than the first area to compensate a visual difference between the transmissive and reflective modes.

In another aspect, there is provided a transreflective type LCD comprising: a thin film transistor substrate having a plurality of pixels, each of the pixels having a thin film transistor formed on a first surface of a first insulation substrate; a lower electrode insulated from the thin film transistor; an upper electrode reflection plate having a first area, for reflecting a light emitted from the first surface toward a second surface opposite the first surface, the upper electrode reflection plate being connected with the thin film transistor, and facing the lower electrode, and the lower electrode and the upper electrode reflection plate forming an image maintaining capacitance; and a pixel electrode having a transmissive area for transmitting a light emitted from the second surface toward the first surface and receiving a power voltage from the thin film transistor, the pixel electrode being connected with the thin film transistor and the transmissive area having a second area larger than that of the first area; a color filter substrate facing the thin film transistor substrate and having a common electrode facing with the pixel electrode; and a liquid crystal interposed between the thin film transistor substrate and the color filter substrate.

In further aspect, there is provided a method for manufacturing a thin film transistor substrate comprising the steps of: forming a gate line having a gate electrode and a lower electrode on a first surface of a first insulation substrate, the lower electrode being insulated from the gate electrode; forming a first insulation layer on the first insulation substrate where the gate line is formed; forming a channel layer on the first insulation substrate where the gate electrode is formed; forming a data line having a source electrode, a drain electrode and an upper electrode reflection plate for reflecting a light emitted from the first surface toward a second surface opposite the first surface, the upper electrode reflection plate being connected with the drain electrode and having a first area, and the lower electrode and the upper electrode reflection plate forming an image maintaining capacitance; forming a second insulation layer over the first insulation substrate to expose a portion of the drain electrode; and forming a pixel electrode electrically connected with the drain electrode on the second insulation layer to receive a power voltage from the drain electrode, the pixel electrode including a transmissive area having a second area larger than the first area for transmitting a light emitted from the second surface toward the first surface.

In still another aspect, there is provided a transreflective type LCD comprising: a first substrate having a transparent substrate having a first surface, a second surface opposite the first surface and a side surface; a thin film transistor disposed on the first surface; a transparent pixel electrode having a first area, for receiving a power voltage output from the thin film transistor; a dielectric layer disposed between the pixel electrode and the first surface; and an image maintaining reflection electrode having a second area, for reflecting a portion of a light emitted from the first surface toward the second surface and charging an electric charge into the dielectric layer, the image maintaining reflection electrode being disposed between the dielectric layer and the first surface; a second substrate facing the first surface of the first substrate and having a color pixel facing with the pixel electrode; and a liquid crystal interposed between the first and second substrates.

In still another aspect, there is provided a method for manufacturing a transreflective type LCD comprising the steps of: forming a gate line connected to a plurality of gate electrodes and an image maintaining reflection electrode having a first area and insulated from the gate line by patterning a metal thin layer formed over a first surface of a first transparent substrate; forming a channel region over the gate electrode to be insulated from the gate electrode; forming a transparent insulation layer over the first surface, on which first and second contact holes are formed to expose at least two portions of the channel region; forming a source electrode connected with the first contact hole, a data line connected with the source electrode and a drain electrode connected with the second contact hole by patterning the metal thin layer; forming a transparent electrode having a second area to be connected with the drain electrode by patterning a transparent conductive thin layer formed over the first surface; assembling a second transparent substrate on which a color pixel and a common electrode are formed, to face the first transparent substrate; and interposing a liquid crystal between the first and second transparent substrates.

According to the present invention, a size of the first area of the reflective electrode is smaller than that of the second area of the transmissive electrode exposed through the transmissive window, so that the differences of the color reproducibility and the brightness between the reflective mode and the transmissive mode are reduced.

Also, the reflective plate for reflecting the first light is formed with the thin film transistor through one process, thereby reducing the number of manufacturing processes of the transreflective type LCD and the thickness thereof.

BRIEF DESCRIPTION OF THE DRAWINGS

The above and other advantages of the present invention will become readily apparent by describing an exemplary embodiment with reference to the accompanying drawings in which:

FIGS. 9A to 9F are cross-sectional views illustrating a method of manufacturing the transreflective type LCD shown in FIG. 8;

FIGS. 12A to 12E are perspective views illustrating a method of manufacturing a TFT substrate shown in FIG. 11;

FIGS. 13A and 13B are views showing another TFT substrate according to the third embodiment of the present invention; and FIG. 14 is a view showing a still another TFT substrate according to the third embodiment of the present invention.

DETAILED DESCRIPTION OF THE INVENTION

Embodiment 1

Figure 2:
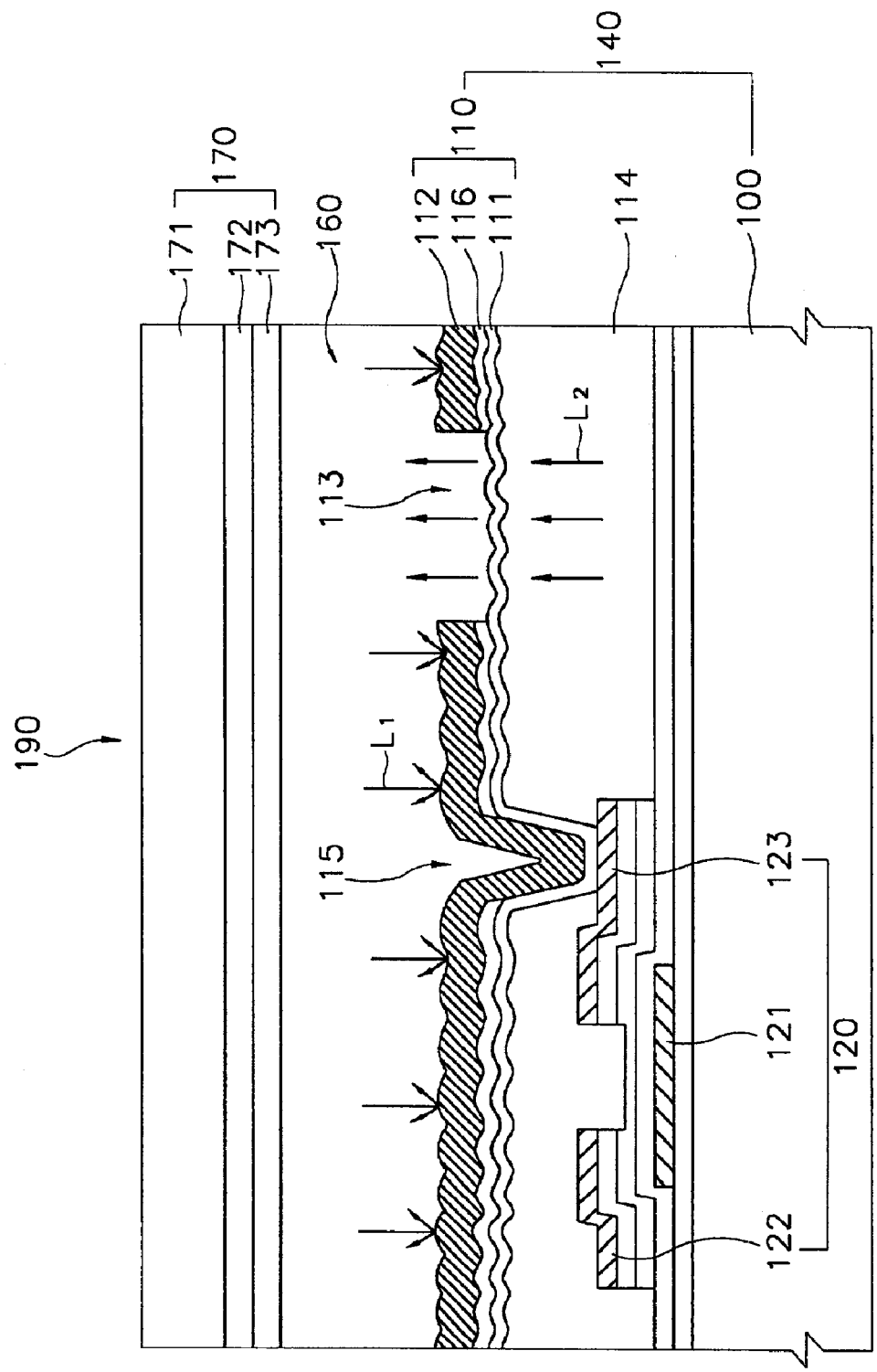
FIG. 2 is a cross-sectional view showing a transreflective type LCD manufactured according to a first embodiment of the present invention.

FIG. 2 is a cross-sectional view showing a transreflective type LCD manufactured according to a first embodiment of the present invention.

Referring to FIG. 2, the transreflective type LCD 190 includes a TFT substrate 140, a color filter substrate 170 facing the TFT substrate 140 and a liquid crystal layer 160 interposed between the TFT substrate 140 and the color filter substrate 170.

The TFT substrate 140 includes a first insulation layer 100, a TFT 120 disposed on the first insulation layer 100, a first organic insulation layer 114 formed with a contact hole 115 on the TFT 120, a transmissive electrode 111 formed on the first organic insulation layer 114, a second organic insulation layer 116 formed on the transmissive electrode 111, a transmissive window 113 and a reflective electrode 112 electrically connected to the transmissive electrode 111. The first insulation layer 100 is made of a transparent material.

The TFT 120 is formed on the first insulation layer 100. The TFT 120 includes a gate electrode 121, a source electrode 122 and a drain electrode 123 and the gate electrode 121 is electrically isolated from the source and drain electrodes 122 and 123 by an insulation layer. The TFT 120 includes a semiconductor layer for applying a power voltage from the source electrode 122 to the drain electrode 123 in response to the power voltage applied to the gate electrode 121.

A plurality of TFTs such as the TFT 120 are formed on the TFT substrate 140 in a matrix shape. The gate electrodes of the TFTs arranged in a column direction among the TFTs arranged in the matrix shape receive a gate power voltage through a common gate line (not shown). That is, the TFTs arranged in a same column are simultaneously turned on or turned off by the power voltage applied through the common gate line corresponding to the column. The source electrodes of the TFTs arranged in a row direction among the TFTs arranged in the matrix shape receive a data power voltage through a common data line (not shown).

When the source electrode 122 of the TFT 120 receives the power voltage and the common gate line corresponding to the source electrode 122 receives a turn-on voltage, the power voltage applied to the common gate line is supplied from the source electrode 122 to the drain electrode 123 through the semiconductor layer. Similarly, the TFTs connected to the common gate line that applies the power voltage to the source electrode 122 of the TFT 120 are operated in response to the power voltage in a manner identical with that of the TFT 120. The liquid crystal 160 is driven in response to the power voltage output from the drain electrode 123 to display the image.

The drain electrode 123 is connected with the pixel electrode 110 on which the transmissive electrode 111 and the reflective electrode 112 are formed. The drain electrode 123 is formed on the semiconductor layer to have a height identical with that of the source electrode 122. Thus, the first organic insulation layer 114 having a predetermined thickness is formed on the TFT 120 to electrically connect only the drain electrode 123 with the transmissive and reflective electrodes 111 and 112. An upper surface of the first organic insulation layer 114 is formed to have a concavo-convex shape.

The first organic insulation layer 114 formed over the first insulation layer 100 includes the contact hole 115 so as to expose a portion of the drain electrode 123 by partially removing the first organic insulation layer 114. After forming the contact hole 115, the transmissive electrode 111 made of an ITO (Indium Tin Oxide) or an IZO (Indium Zinc Oxide) is deposited on the exposed drain electrode 123 and the first organic insulation layer 114 to have a uniform thickness.

The second organic insulation layer 116 having a uniform thickness is formed on the transmissive electrode 111. For example, an acryl-based organic insulation layer is used as the second organic insulation layer 116. The second organic insulation layer 116 formed on the transmissive electrode 111 includes two openings. A first opening is the contact hole 115, which is formed corresponding to a position of the drain electrode, and a second opening is formed apart from the TFT 120 in a predetermined distance to expose a portion of the transmissive electrode 111 and used as the transmissive window 113. The reflective electrode 112 is electrically connected with the transmissive electrode 111 through the contact hole 115. An upper surface of the second organic insulation layer 116 is formed to have the concavo-convex shape.

The reflective electrode 112 is formed on the second organic insulation layer 116 and reflects a first light L1 incident from an external to the TFT substrate 140. Since the reflective electrode 112 has a surface structure such as the concavo-convex shape identical with that of the second organic insulation layer 116, the reflective electrode 112 increases a reflected amount of the first light L1 and diffuses the first light L1. The reflective electrode 112 includes the transmissive window 113 to expose a portion of the transmissive electrode 111. The transmissive window 113 transmits a second light L2 generated in the transreflective type LCD 190.

Figure 3:
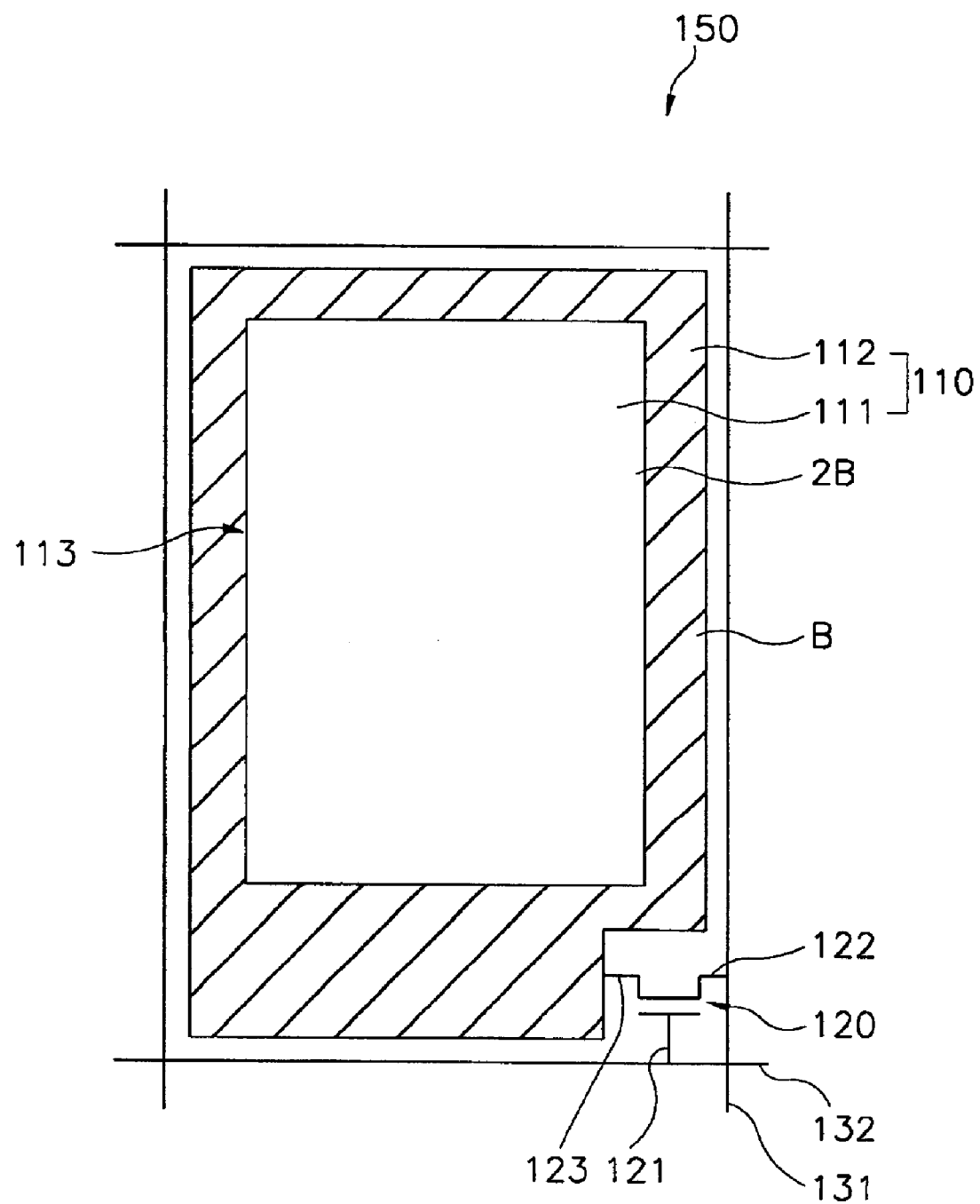
FIG. 3 is a plan view showing a unit pixel of the transreflective type LCD shown in FIG. 2.

The TFT substrate 140 is combined with the color filter substrate 170 having the second insulation layer 171 on which a RGB pixel 172 and a common electrode 173 are formed. The liquid crystal 160 is interposed between the color filter substrate 170 and the TFT substrate 140. In FIG. 3, reference characters "B" and "2B" represent an area (first area) of the reflective electrode 12, and an area (second area) of the transmissive window 13, respectively. Accordingly, an area of the transmissive electrode 11 exposed by the transmissive window 13 is the same as "2B". The first area of the reflective electrode 112 is smaller than the second area of the transmissive electrode 111 exposed by the transmissive window 113. That is, the second area of the transmissive electrode 111 exposed by the transmissive window 113 has a size enough to reduce a visual difference between the transmissive and the reflective modes. As an area of the pixel electrode 110 is constant, an increase in the second area results in a decrease in the first area. The ratio "X" of the second area with respect to the first area is determined depending on a reflective efficiency of the reflective electrode 112. The ratio "X" is propotional to the reflective efficiency of the reflective electrode 112. FIG. 3 is a plan view showing a unit pixel of the transreflective type LCD shown in FIG. 2.

Referring to FIG. 3, a unit pixel 150 includes the TFT 120 and the pixel electrode 110 connected with the TFT 120. The gate electrode 121 of the TFT 120 is connected with the common gate line 131 printed on the first insulation substrate 100, the source electrode 122 thereof is connected with the common data line 132 printed on the first insulation substrate 100 and the drain electrode 123 is connected with the pixel electrode 110.

The pixel electrode 110 is formed on the first organic insulation layer 116 and includes the transmissive electrode 111 made of the transparent ITO material and the reflective electrode 112 made of a metal material and formed on the transmissive electrode 111. The reflective electrode 112 includes the transmissive window 113 and the transmissive window 113 partially exposes the transmissive electrode 111.

Assuming that an area of the pixel electrode 110 is defined as a third area, the reflective electrode 112 has the first area which is obtained by subtracting the size of the second area corresponding to the size of the transmissive window 113 from that of the third area. The second area is greater than the first area and a ratio of size between the first and second areas is determined depending on the reflective efficiency of the reflective electrode 112.

In the conventional unit pixel, the size of the transmissive window is smaller than that of the reflective electrode. For example, in FIG. 1, the first area which indicates the size of the reflective electrode 12 and the second area which indicates the size of the transmissive electrode 11 are shown as "2A" and "A", respectively. Thus, the size of the third area of the pixel electrode 10 corresponds to "2A+A=3A".

However, in the unit pixel 150 according to the present invention, the size of the transmissive window is greater than that of the reflective electrode. For example, as shown in FIG. 3, the third area which indicates the size of the pixel electrode 110, the first area which indicates the size of the reflective electrode 112 and the second area which indicates the size of the transmissive electrode 111 exposed by the transmissive window 113 are "3B", "B" and "2B", respectively.

Figure 4:
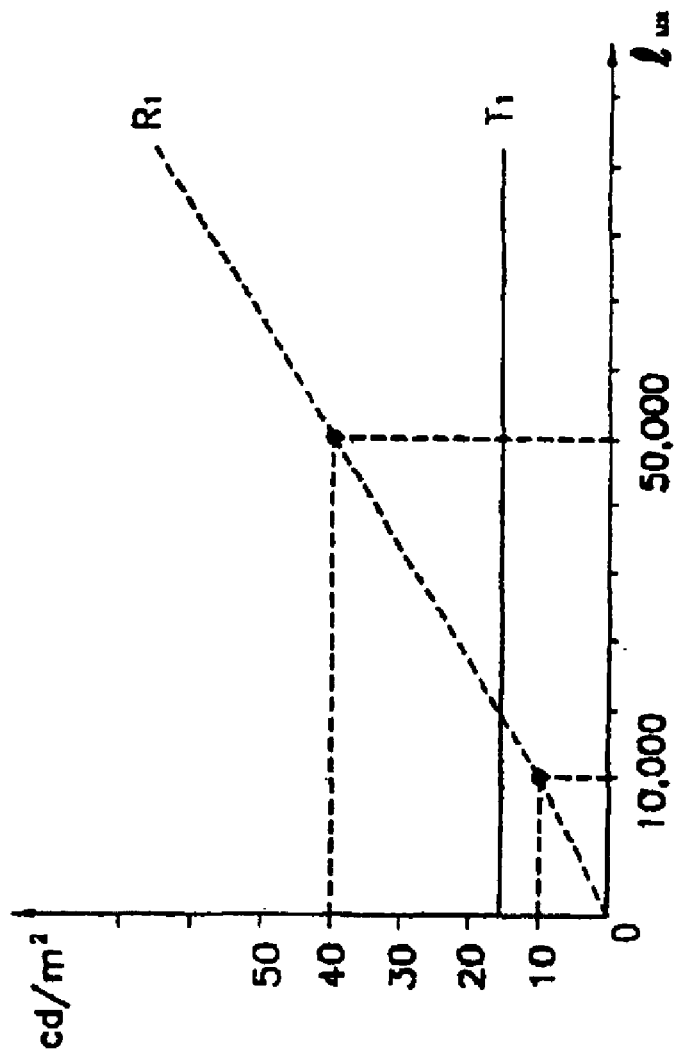
FIG. 4 is a graph showing a brightness distribution in a reflective mode and a transmissive mode of a conventional transreflective type LCD.
Figure 5:
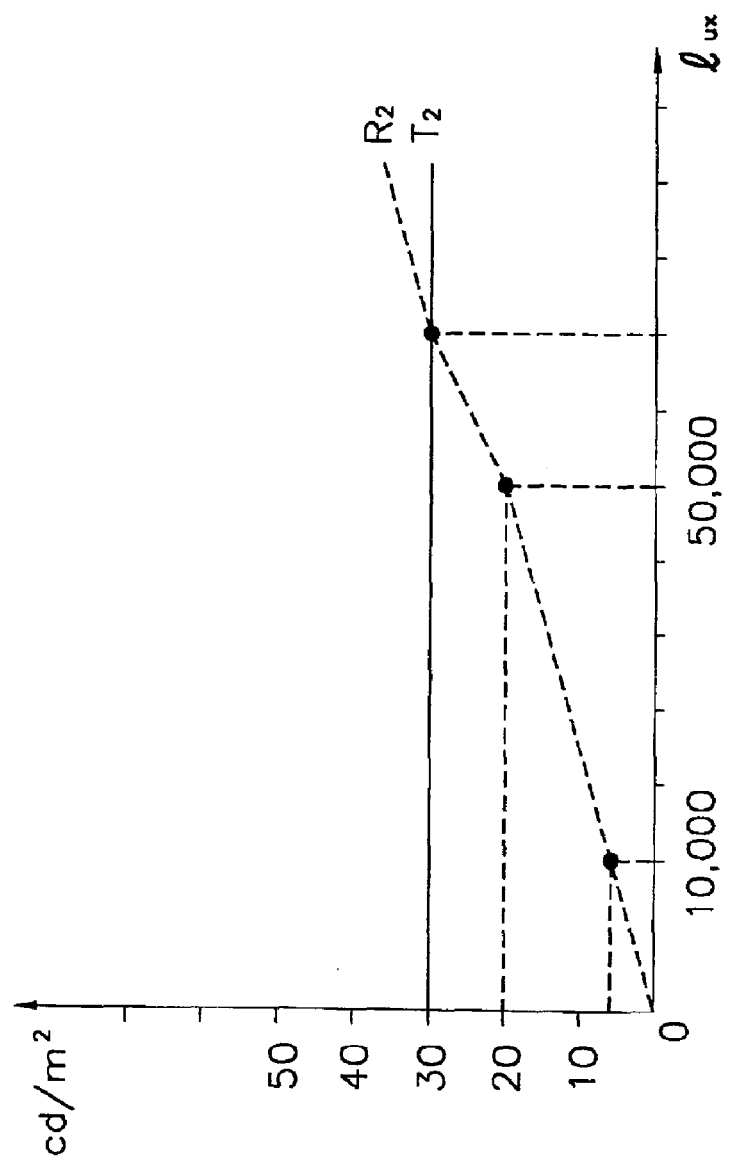
FIG. 5 is a graph showing a brightness distribution in a reflective mode and a transmissive mode of the transreflective type LCD shown in FIG. 3.

FIG. 4 is a graph showing a brightness distribution in a reflective mode and a transmissive mode of a conventional transreflective type LCD. FIG. 5 is a graph showing a brightness distribution in a reflective mode and a transmissive mode of the transreflective type LCD shown in FIG. 3. In FIG. 4, characters "$R_1$" and "$T_1$" indicate brightness distributions in the reflective and transmissive modes of the LCD having a pixel electrode shown in FIG. 1, respectively. In the FIG. 5, characters "$R_2$" and "$T_2$" indicate brightness distributions in the reflective and transmissive modes of the LCD having a pixel electrode shown in FIG. 3, respectively. In the FIGS. 4 and 5, the reflective electrode has a reflective efficiency of about 30% and the transreflective type LCD has an effective display area corresponding to about 2 inches in its diagonal line. X-axis indicates a luminosity (lux) of the first light and Y-axis indicates a brightness ($cd/m^2$) of the transreflective LCD.

Figure 1:
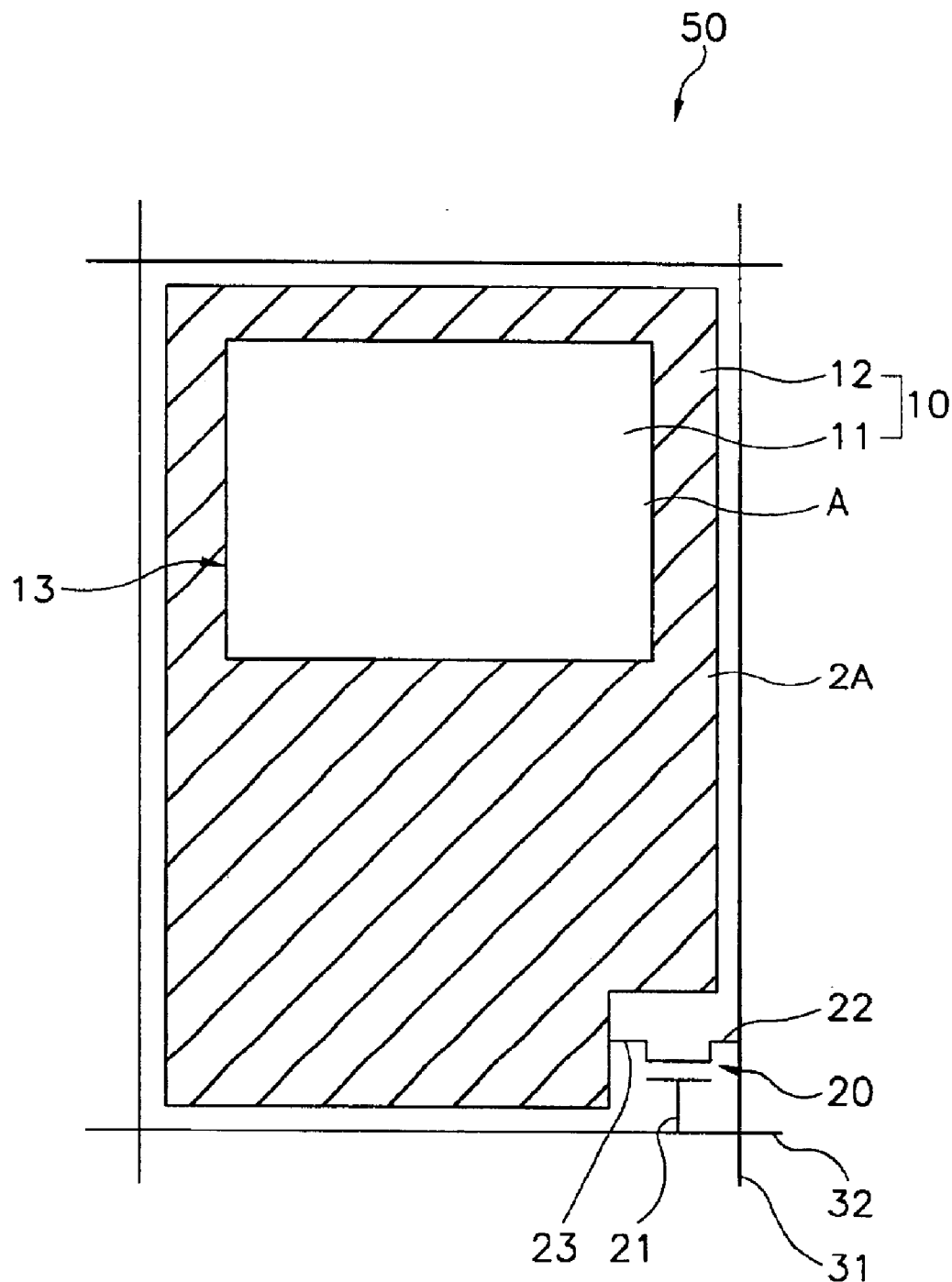
FIG. 1 is a plan view showing a unit pixel of a conventional transreflective type LCD.

Referring to FIG. 1, the size of the reflective electrode 12 is greater than that of the transmissive electrode 11 exposed through the transmissive window 13. The brightness in the transmissive mode is maintained as about 15 $cd/m^2$. The brightness in the reflective mode is varied depending on the luminosity of the first light. The reflective mode has a brightness of about 10 $cd/m^2$ when the first light has a luminosity of about 10,000 lux and a brightness of about 40 $cd/m^2$ when the first light has a luminosity of about 50,000 lux.

As shown in FIG. 4, the conventional transreflective type LCD displays the image in the transmissive mode using the second light where the brightness in the reflective mode is lower than about 15 $cd/m^2$ and displays the image in the reflective mode using the first light where the brightness in the reflective mode is higher than about 15 $cd/m^2$. That is, the conventional transreflective type LCD displays the image in the transmissive mode only where the luminosity of the first light is not enough to display the image. As shown in FIG. 4, the brightness in the reflective mode becomes higher as the luminosity of the first light becomes higher. Thus, the brightness difference between the reflective and transmissive modes increases as the luminosity of the first light becomes higher.

Referring to FIG. 3, the size of the second area of the transmissive electrode 111 exposed through the transmissive window 113 is larger than that of the first area of the reflective electrode 112 according to the transreflective type LCD of the present invention. In FIG. 3, the size of the second area is twice that of the first area.

Referring to FIG. 5, the brightness in the transmissive mode is about 30 $cd/m^2$, which is about twice that of the conventional transmissive type LCD because the size of the second area of the transmissive electrode 111 increases about twice. The brightness in the reflective mode is varied depending on the luminosity of the first light supplied from an external. Thus, the brightness in the reflective mode decreases because the size of the first area of the reflective electrode 112 decreases to about a half. The reflective mode shows a brightness of about 5 $cd/m^2$ when the first light shows a luminosity of about 10,000 lux and shows a brightness of about 20 $cd/m^2$ when the first light has a luminosity of about 50,000 lux.

As shown in FIG. 5, the transreflective type LCD of the present invention displays the image in the transmissive mode using the second light where the brightness in the reflective mode is lower than about 30 $cd/m^2$ and displays the image in the reflective mode where the brightness in the reflective mode is higher than about 30 $cd/m^2$. That is, the transreflective type LCD of the present invention displays the image in the reflective mode where the luminosity of first light is enough to display the image.

The first area decreases as the second area of the exposed transmissive electrode 111 increases, so that an increase rate of the brightness according to an increase of the luminosity of the first light in the reflective mode is less than that of the conventional transreflective type LCD. Thus, the brightness difference between the reflective and transmissive modes decreases. The reflective mode and the transmissive mode can be alternatively selected by a user. Also, the mode can be automatically selected based on the luminosity of the first light detected by a sensor.

As shown in FIG. 3, the transmissive window 113 that partially exposes the transmissive electrode 111 may have a rectangular shape. However, the transmissive window 113 may have various forms provided that the size of the second area is greater than that of the first area.

Figure 6:
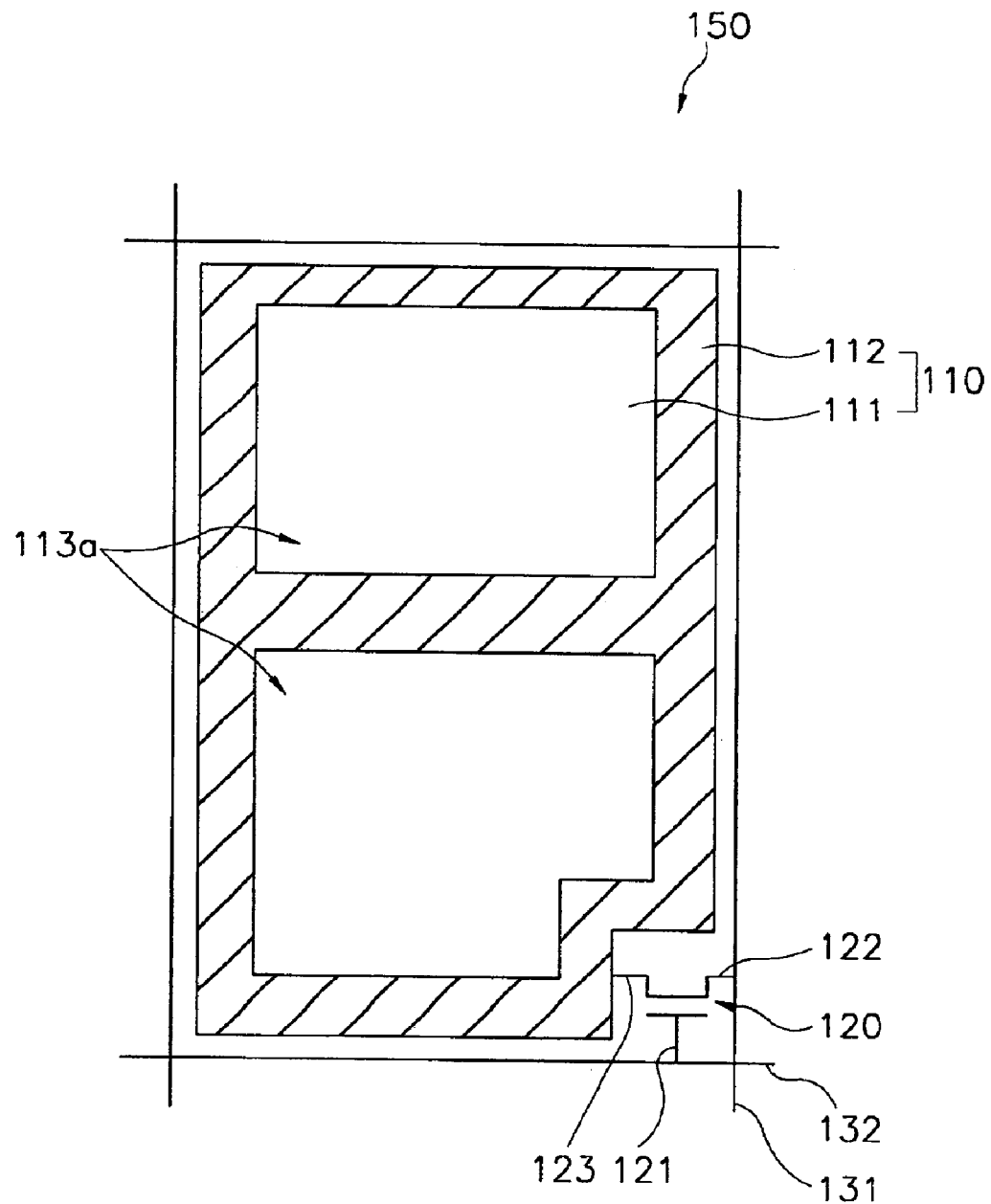
FIGS. 6 and 7 are views showing unit pixels according to the first embodiment of the present invention.
Figure 7:
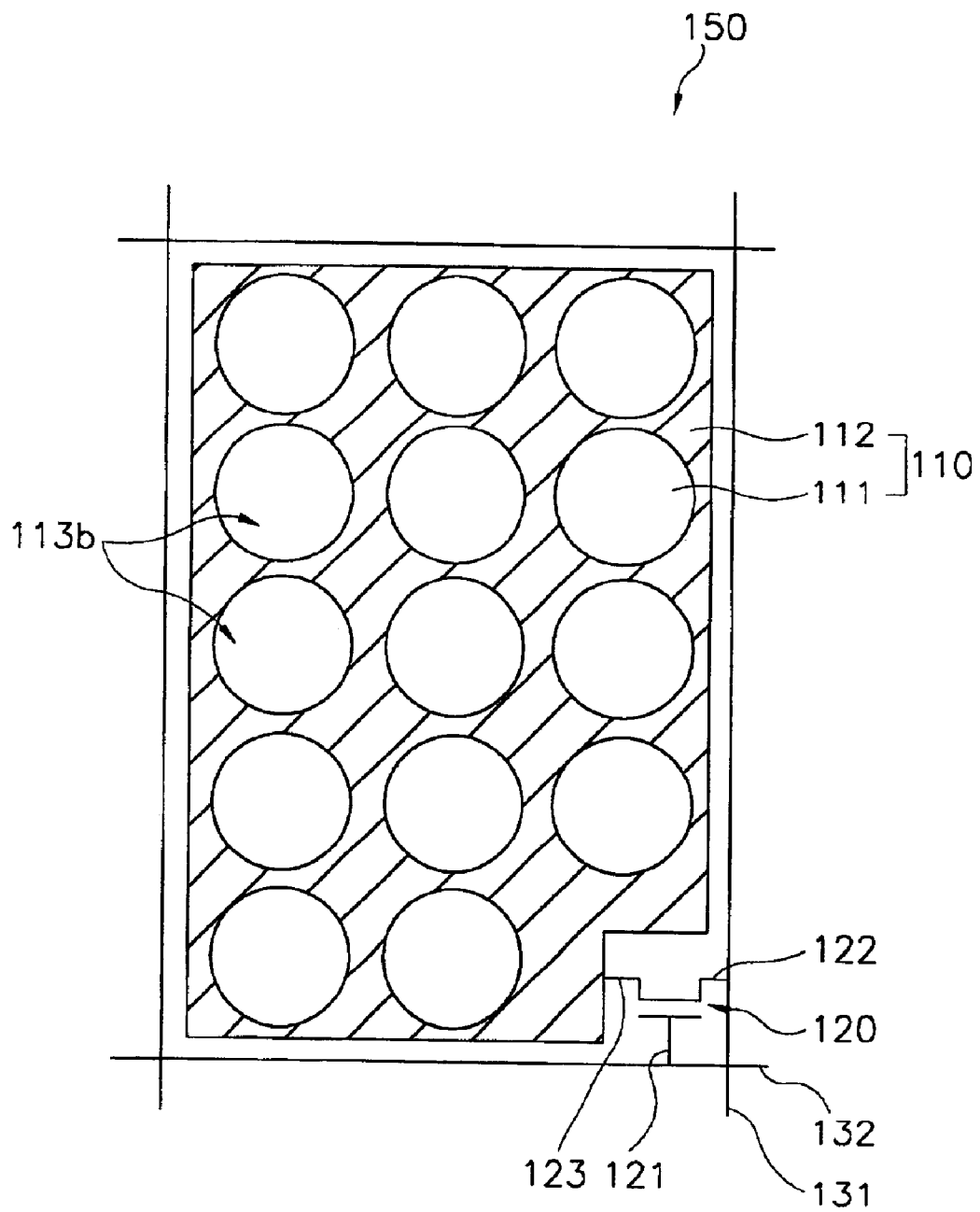

FIGS. 6 and 7 are views showing unit pixels according to the first embodiment of the present invention.

Referring to FIGS. 6 and 7, a plurality of transmissive windows can be formed. FIG. 6 shows two transmissive windows 113a formed on the reflective electrode 112 in a rectangular shape. FIG. 7 shows a plurality of transmissive windows 113b in a circle shape. In case of forming multiple transmissive windows 113a and 113b, the reflective electrode 112 can be uniformly formed in the pixel electrode 110, thereby increasing the uniformity of the first light reflected by the reflective electrode 112.

Embodiment 2

Figure 8:
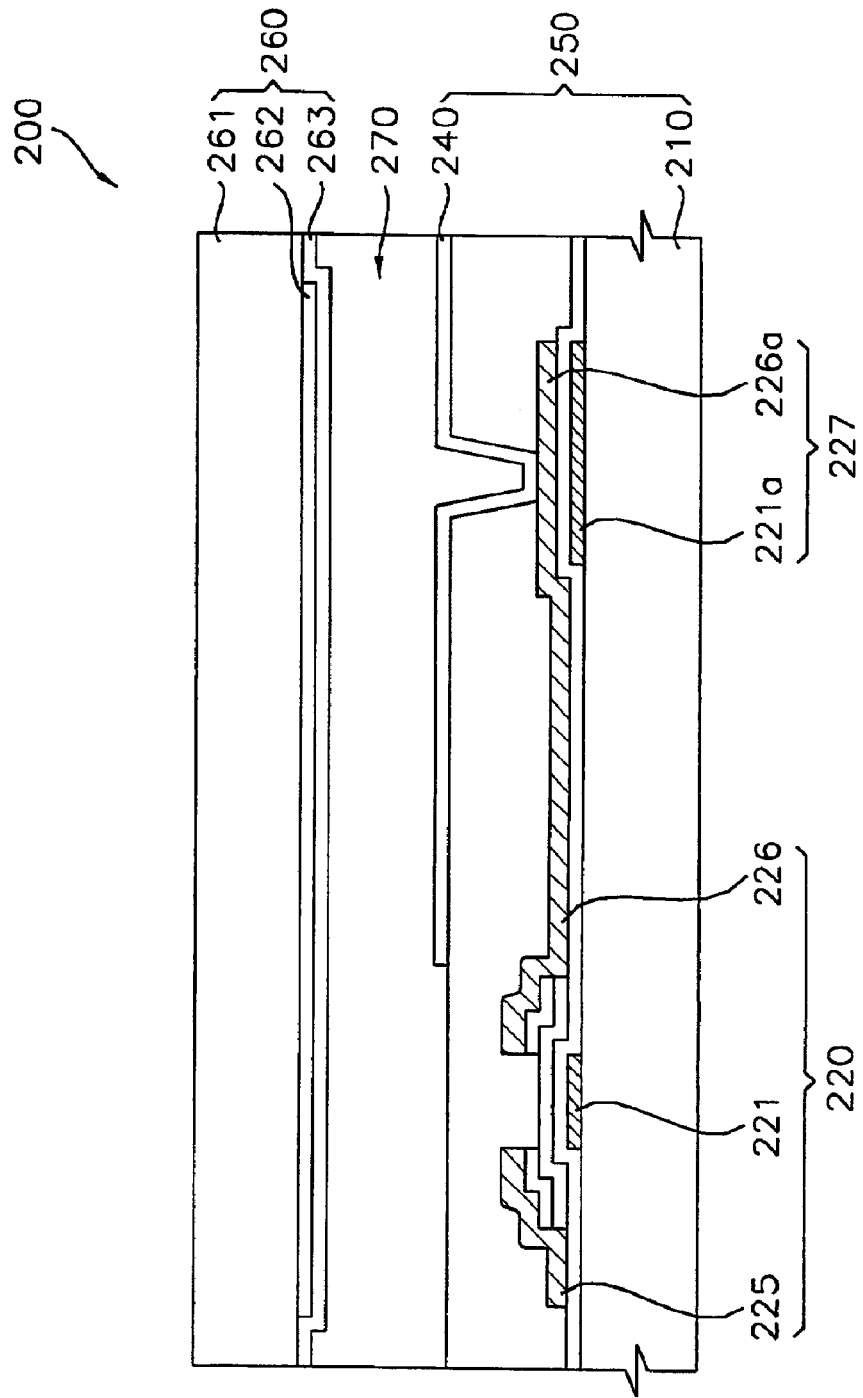
FIG. 8 is a cross-sectional view showing a transreflective type LCD according to a second embodiment of the present invention.

FIG. 8 is a cross-sectional view showing a transreflective type LCD according to a second embodiment of the present invention.

Referring to FIG. 8, a transreflective type LCD 200 includes a TFT substrate 250, a color filter substrate 260 facing the TFT substrate 250 and a liquid crystal layer 270 interposed between the TFT substrate 250 and the color filter substrate 260.

The TFT substrate 250 includes a first insulation substrate 210 on which a plurality of pixels is formed. Each of the pixels includes a TFT 220 having a gate electrode, a source electrode and a drain electrode, an image maintaining capacitance 227 including a lower electrode 221a and an upper electrode reflection plate 226a which reflects a first light, and a transmissive electrode 240 for controlling an alignment of the liquid crystal 270 in response to a power voltage supplied from the TFT 220 and transmitting the first light at a region other than a region corresponding to the upper electrode reflection plate 226a.

The color filter substrate 260 includes a second insulation substrate 261. RGB pixels 262 and a common electrode 263 are sequentially provided on a lower surface of the second insulation substrate 261. The color filter substrate 260 faces the TFT substrate 250 and the common electrode 263 faces the pixel electrode 240 of the TFT substrate 250. After coupling the TFT substrate 250 and the color filter substrate 260, the liquid crystal 270 is injected between the TFT substrate 250 and the color filter substrate 260, thereby completing the transreflective type LCD 200.

Hereinafter, a structure and a method of manufacturing the TFT substrate will be described with reference to FIGS. 9A to 10D.

Figure 9A:
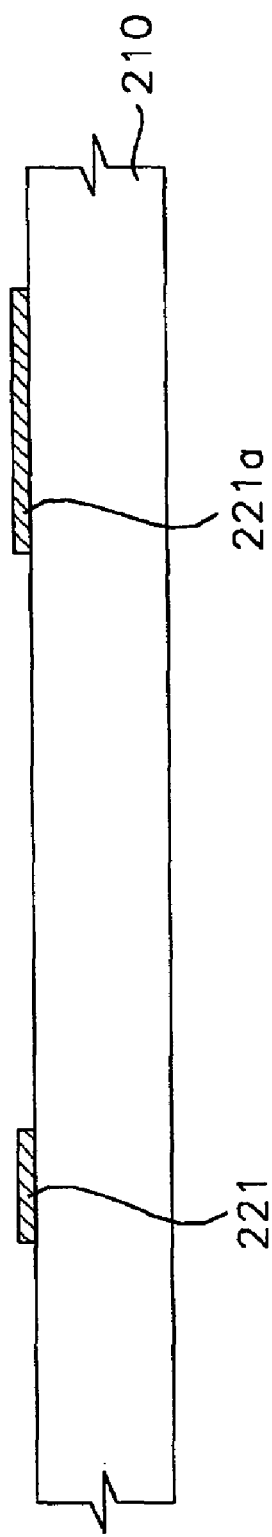
Figure 9B:
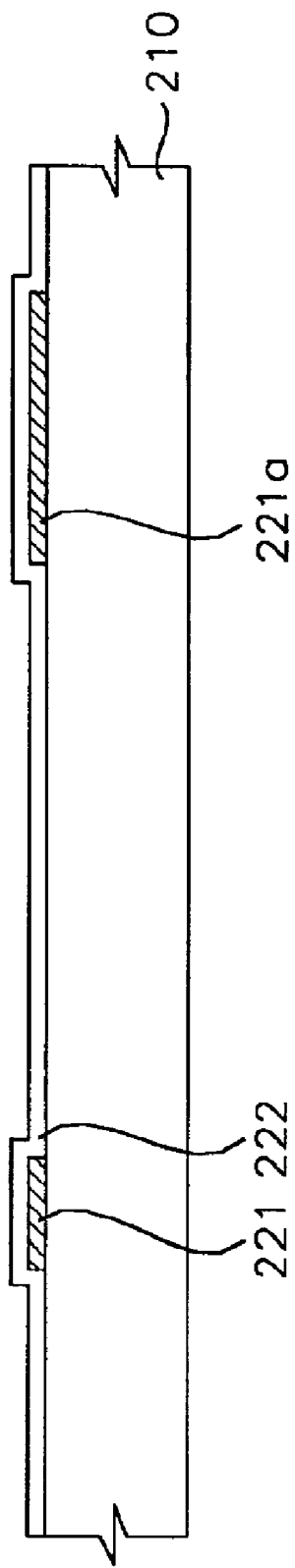
Figure 9C:
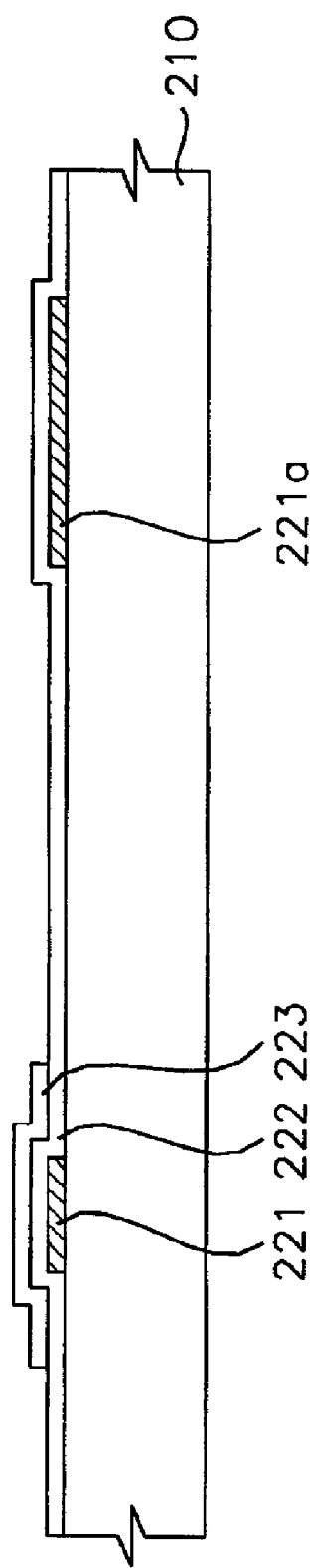
Figure 9D:
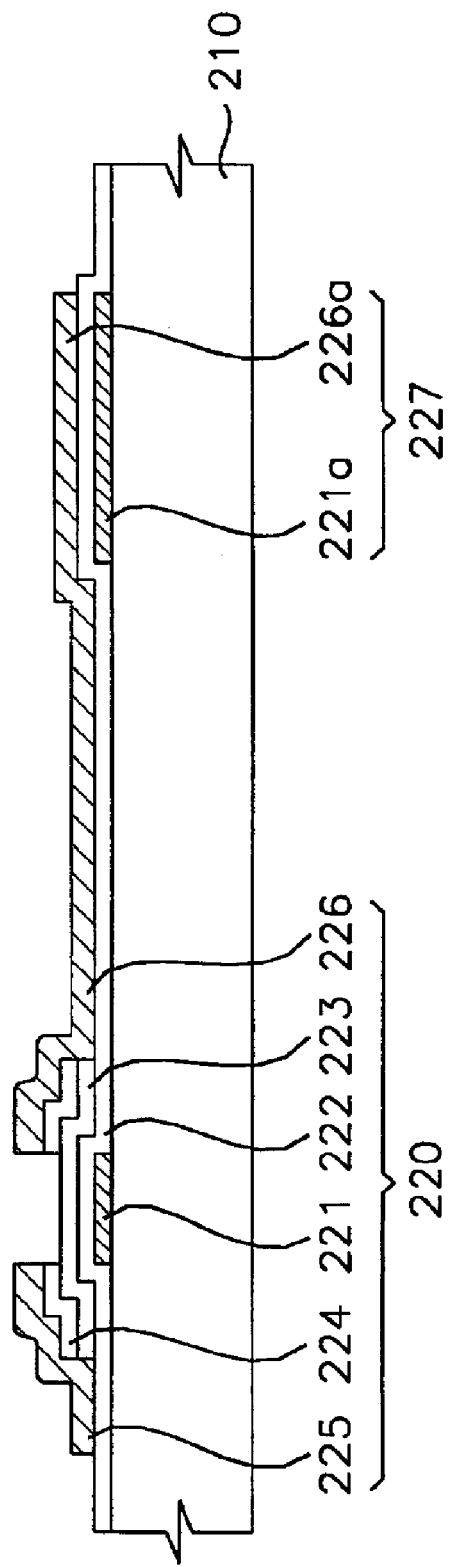
Figure 10A:
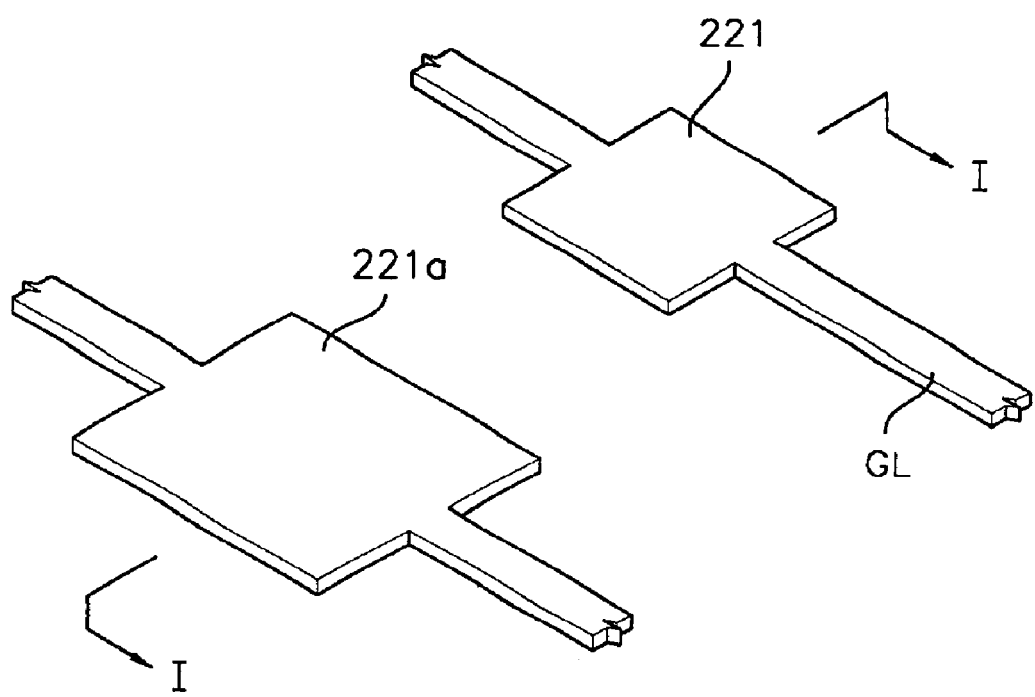
FIG. 10A is a perspective view showing a TFT substrate shown in FIG. 9A.

FIGS. 9A to 9F are cross-sectional views illustrating a method of manufacturing the TFT substrate shown in FIG. 8. FIG. 10A is a perspective view showing a TFT substrate shown in FIG. 9A, FIG. 10B is a perspective view showing a TFT substrate shown in FIG. 9C, FIG. 10C is a perspective view showing a TFT substrate shown in FIG. 9D, and FIG. 10D is a perspective view showing a TFT substrate shown in FIG. 9F.

Figure 10B:
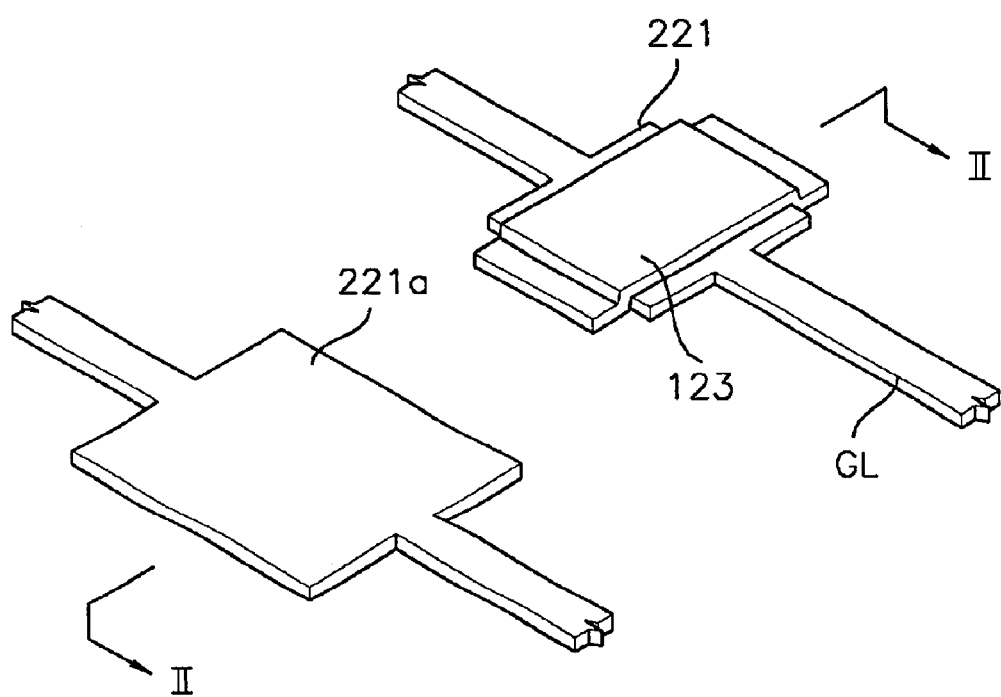
FIG. 10B is a perspective view showing a TFT substrate shown in FIG. 9C.
Figure 10C:
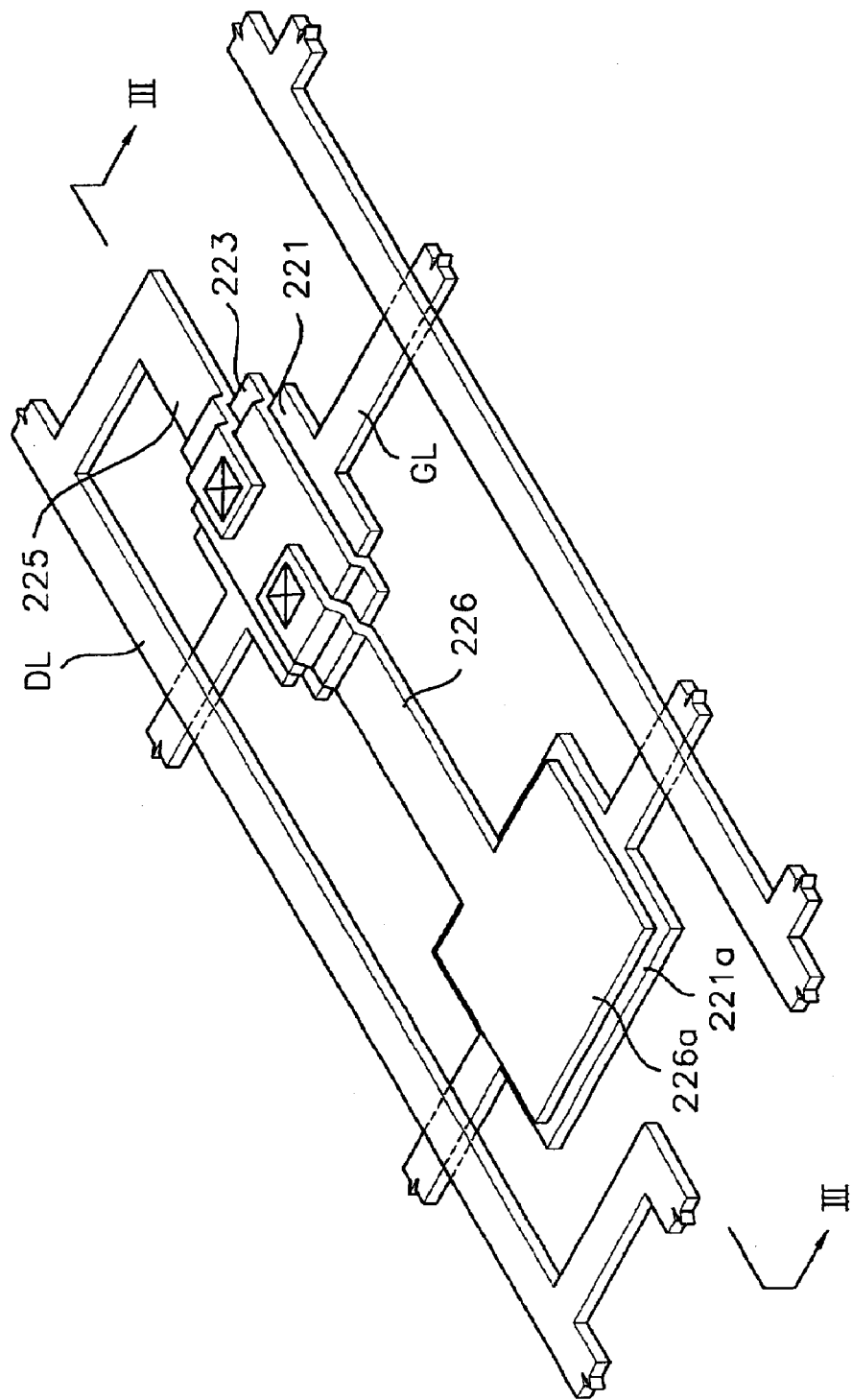
FIG. 10C is a perspective view showing a TFT substrate shown in FIG. 9D.
Figure 10D:
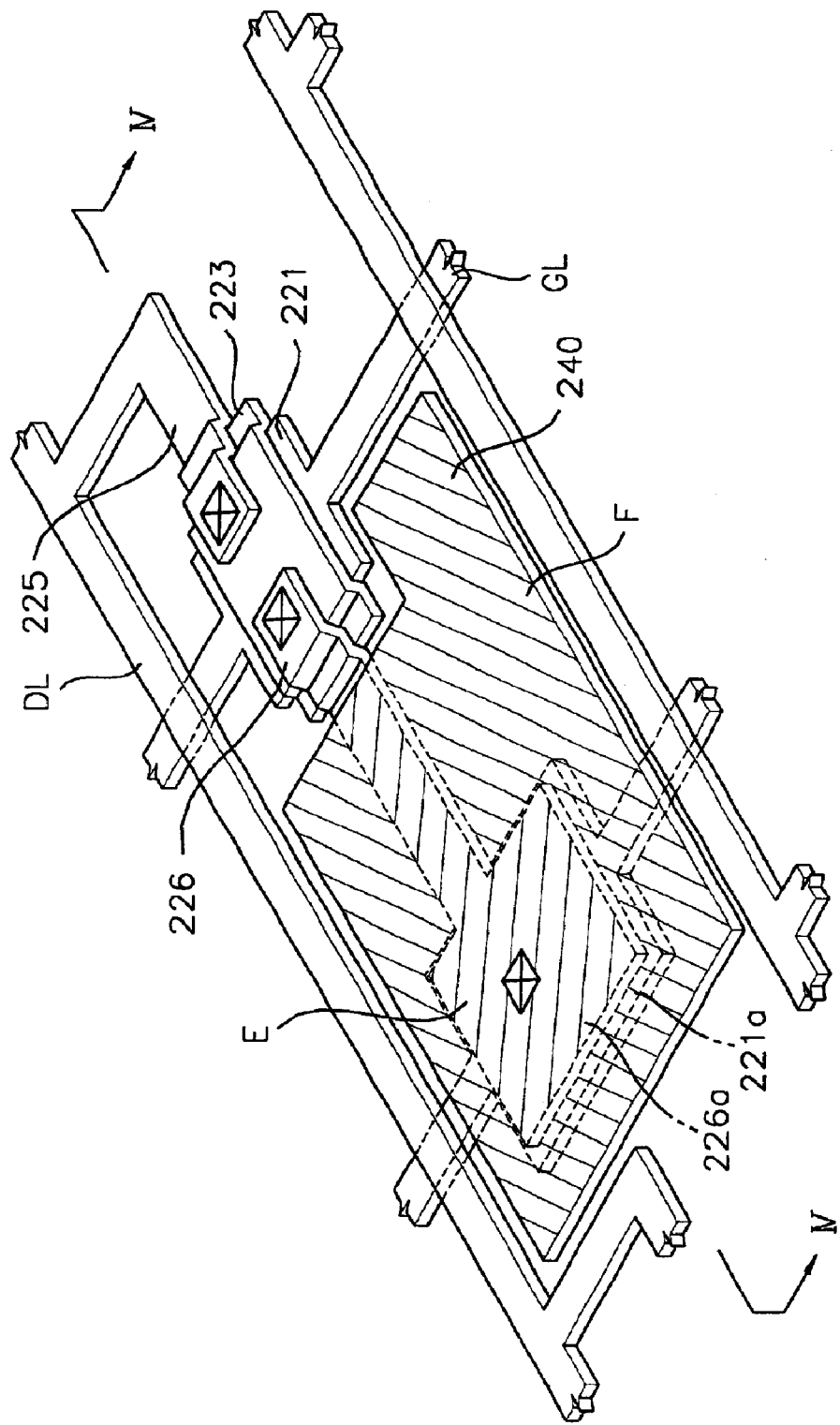
FIG. 10D is a perspective view showing a TFT substrate shown in FIG. 9F.

FIG. 9A is a cross-sectional view taken along the line of I—I for showing a structure of the TFT substrate shown in FIG. 10A and FIG. 9C is a cross-sectional view taken along the line of II—II for showing a structure of the TFT substrate shown in FIG. 10B. FIG. 9D is a cross-sectional view taken along the line of III—III for showing a structure of the TFT substrate shown in FIG. 10C and FIG. 9F is a cross-sectional view taken along the line of IV—IV for showing a structure of the TFT substrate shown in FIG. 10D.

Referring to FIGS. 9A and 10A, the TFT 220 used as a switching device is formed on the first insulation substrate 210 made of a non-conductive material such as a glass or a ceramic. To form the TFT 220, a first metal layer such as an aluminum (Al), a molybdenum (Mo), a chromium (Cr), a tantalum (Ta), a titanium (Ti), a copper (Cu) or a tungsten (W) is deposited on the first insulation layer 210. The first metal layer is patterned to form a gate circuit. The gate circuit includes a gate line GL having a gate electrode 221 of the thin film transistor 220 and the lower electrode 221a that forms the image maintaining capacitance 227. The gate electrode 221 is formed to have a width larger than that of the gate line GL and separated from the lower electrode 221a in a predetermine space.

Referring to FIG. 9B, a silicon nitride (SixNy) is deposited over the first insulation substrate 210 having the gate line GL and the lower electrode 221a by a plasma chemical vapor deposition (PCVD) method to form a gate insulation layer 222.

Referring to FIGS. 9C, 9D and 10B, an amorphous silicon layer and n+ amorphous silicon layer doped using an in-situ are sequentially deposited on the gate insulation layer 222 by the PCVD method. The amorphous silicon layer and n+ amorphous silicon layer are patterned to form a semiconductor layer 223 and an ohmic contact layer 224 on a portion of the gate insulation layer 222. The portion of the gate insulation layer 222 corresponds to the gate electrode 221 disposed under the portion of the gate insulation layer 222. The amorphous silicon layer may be transformed into a polysilicon layer by a laser.

Referring to FIGS. 9D and 10C, after depositing a second metal layer such as an aluminum (Al) or a silver (Ag) on the first insulation layer 210, the second metal layer is patterned to form a data line DL intersecting the gate line GL, source and drain electrodes 225 and 226 branched from the data line DL. The image maintaining capacitance 227 and the upper electrode reflection plate 226a are formed on the gate insulation layer 222 corresponding to the lower electrode 221a. Thus, the TFT 220 having the gate electrode 221, the semiconductor layer 223, the ohmic contact layer 224, the source electrode 225 and the drain electrode 226 is formed on a pixel portion of the first insulation substrate 210. Also, the upper electrode reflection plate 226a reflects the first light, which is input from an external of the transreflective type LCD 200 to the TFT substrate 250 through the color filter substrate 260, to the color filter substrate 260 because the upper electrode reflection plate 226a is made of a material such as aluminum (Al) or silver (Ag).

As shown in FIG. 9D, the image maintaining capacitance 227 is formed by the lower electrode 221a having a height identical with that of the gate electrode 221 and the upper electrode reflection plate 226a having a height identical with that of the source and drain electrodes 225 and 226. Thus, it is able to reduce a distance between the lower electrode 221a and the upper electrode reflection plate 226a, thereby increasing a capacity of the image maintaining capacitance 227.

Referring to FIG. 9E, after forming the TFT 220 and the image maintaining capacitance 227 on the first insulation substrate 210, a photosensitive organic insulation layer 230 is formed over the first insulation substrate 210 using a spin coating method. The photosensitive organic insulation layer 230 is patterned to form a contact hole 231 that exposes the drain electrode 226 of the TFT 220. The photosensitive organic insulation layer 230 is comprised of an organic insulation material such as a bisbenzocyclobutene (BCB) or a perfluorocyclobutene (PFCB), or an inorganic insulation material such as a silicon-oxide ($SiO_2$) or a silicon-nitride (SiNx).

Referring to FIGS. 9F and 10D, the transmissive electrode 240 is formed on the photosensitive organic insulation layer 230. The transmissive electrode 240 generates an electric field with the common electrode 263 to control the liquid crystal 270 in response to a power voltage from the TFT 220. The transmissive electrode 240 is made of the ITO or the IZO and connected with the drain electrode 226 through the contact hole 231 to receive the power voltage from the TFT 220.

As shown in FIG. 10D, a fourth area "E" of the upper electrode reflection plate 226a is formed to have a size smaller than that of a fifth area of the transmissive electrode 240. That is, the fourth area "E" is smaller than a sixth area "F" that is obtained by subtracting the fourth area "E" from the fifth area. The sixth area "F" indicates an area of the transmissive electrode 240 other than the upper electrode reflection plate 226a of the transmissive electrode 240. The sixth area "F" corresponds to a transmissive area for transmitting the second light.

If the fourth area "E" of the upper electrode reflection plate 226a is formed to have the size smaller than that of the sixth area "F" of the transmissive area, a brightness difference between the reflective and the transmissive modes can be reduced. If the reflective efficiency of the upper electrode reflection plate 226a increases, the size of the fourth area "E" of the upper electrode reflection plate 226a becomes smaller. The size of the fourth area "E" of the upper electrode reflection plate 226a is no less than one-third of the fifth area of the transmissive electrode 240, thereby preventing the brightness in the reflective mode from being lowered. The upper electrode reflection plate 226a is formed to have the fourth area "E" smaller than the sixth area "F". Thus, even though the first light passes through the RGB pixels more than twice in the reflective mode, a difference of color reproducibility between the reflective and the transmissive modes can be reduced.

Embodiment 3

Figure 11:
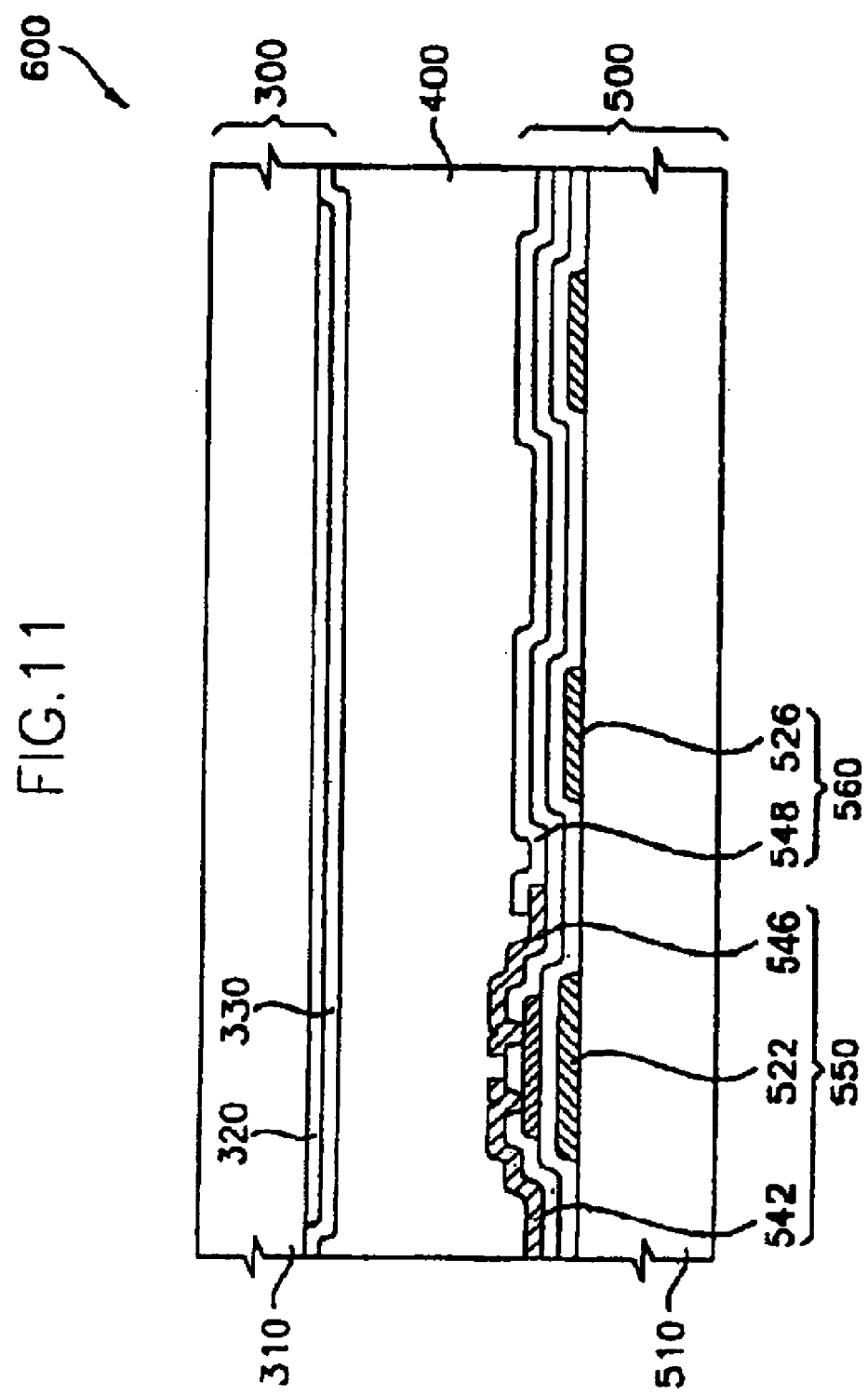
FIG. 11 is a cross-sectional view showing a unit pixel of a transreflective type LCD according to a third embodiment of the present invention.

FIG. 11 is a cross-sectional view showing a unit pixel of a transreflective type LCD according to a third embodiment of the present invention.

Referring to FIG. 11, a transreflective type LCD 600 includes a TFT substrate 500, a color filter substrate 300 facing the TFT substrate 500 and a liquid crystal layer 400 interposed between the TFT substrate 500 and the color filter substrate 300.

The TFT substrate 500 includes a plurality of pixels. Each of the pixels includes a TFT 550, a transmissive electrode 548 connected with a drain electrode 546 of the TFT 500 and used as a first electrode of an image maintaining capacitance 560 and a first image maintaining reflective electrode 526 formed to have a height identical with that of a gate electrode 522 of the TFT 550 and used as a second electrode of the image maintaining capacitance 560. The first image maintaining reflective electrode 526 faces the transmissive electrode 548.

The color filter substrate 300 includes a second insulation substrate 310. RGB pixels 320 and a common electrode 330 having a uniform thickness are sequentially provided on a lower surface of the second insulation substrate 310. The color filter substrate 300 faces the TFT substrate 500 and the common electrode 320 faces the transmissive electrode 548 of the TFT substrate 500. After coupling the TFT substrate 500 and the color filter substrate 300, the liquid crystal 400 is injected between the TFT substrate 500 and the color filter substrate 300, thereby completing the transreflective type LCD 600.

Hereinafter, a method of manufacturing the TFT substrate 500 will be described with reference to FIGS. 12A to 12E.

FIGS. 12A to 12E are perspective views illustrating a method of manufacturing the TFT substrate shown in FIG. 11.

Figure 12B:
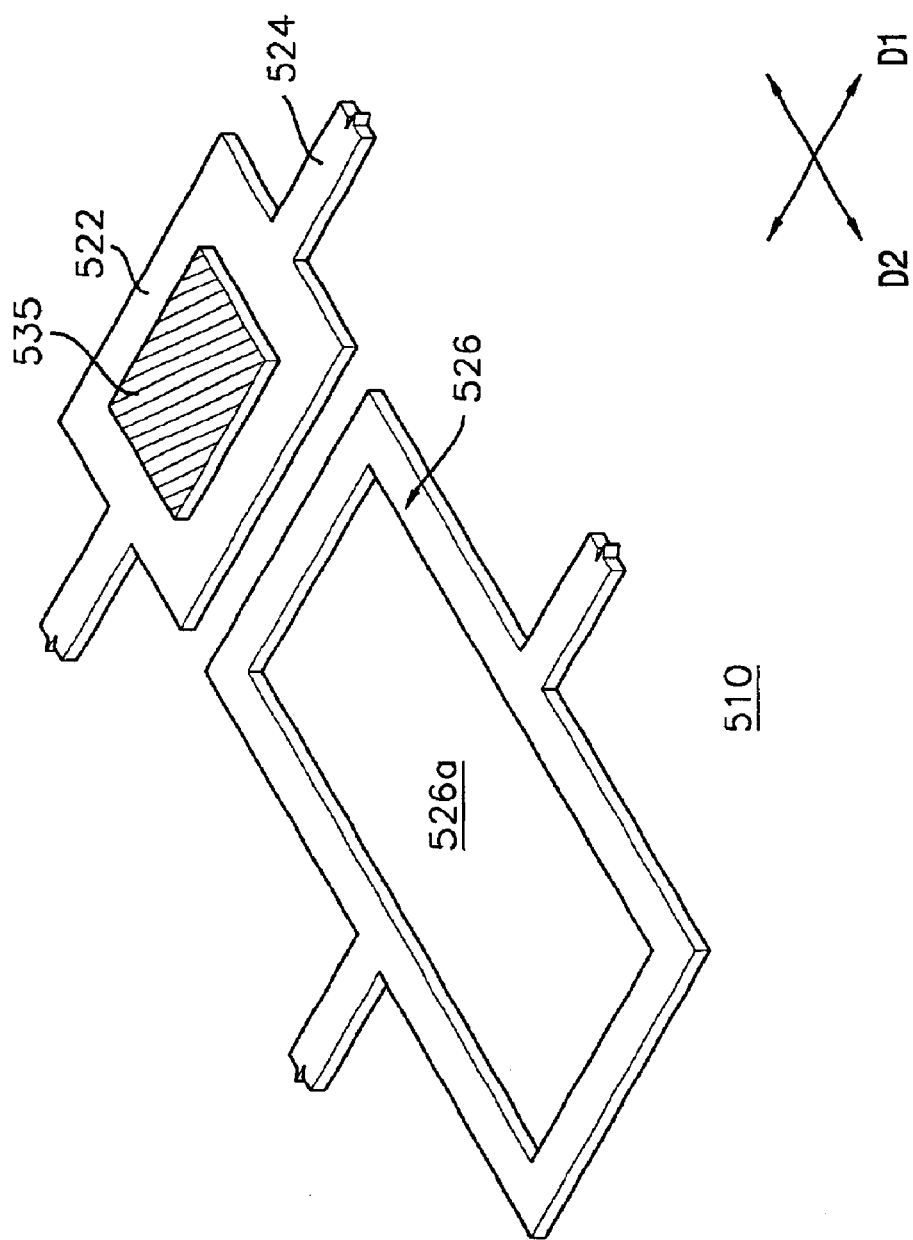
Figure 12D:
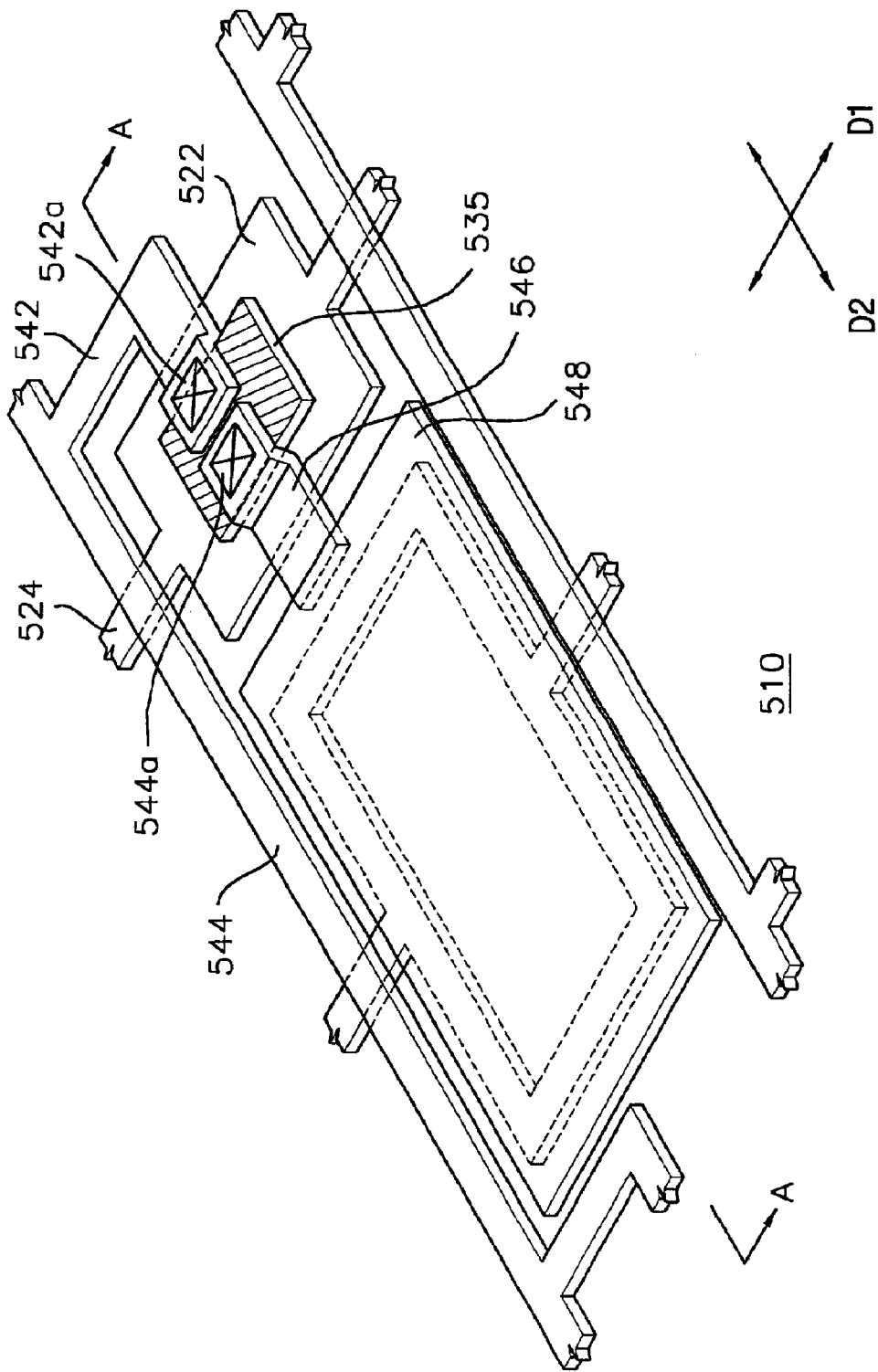
Figure 12E:
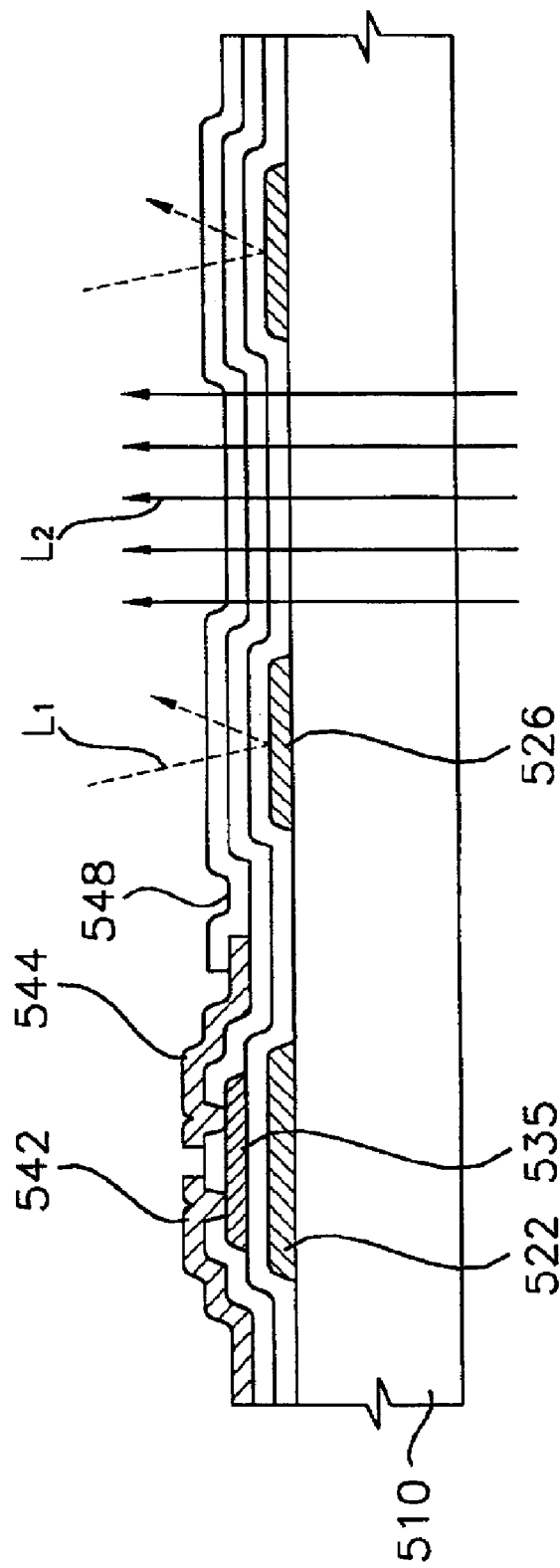

FIG. 12A is a perspective view showing a gate line, a gate electrode and an image maintaining reflective electrode disposed on a transparent substrate, FIG. 12B is a perspective view showing a channel layer disposed on the gate electrode shown in FIG. 12A, FIG. 12C is a perspective view showing a data line, a source electrode and a drain electrode disposed on the transparent substrate, FIG. 12D is a perspective view showing a transparent transmissive electrode disposed on the transparent substrate and FIG. 12E is a cross-sectional view taken along the line A—A for showing a structure of the TFT substrate.

Referring to FIG. 12A, a transparent substrate 510 includes a gate metal thin layer (not shown) formed thereon. The gate metal thin layer is patterned using a photolithography process to form a gate electrode 522, a gate line 524 and a first image maintaining reflective electrode 526. The gate line 524 and the gate electrode 522 can be variously formed depending on a design rule of the TFT substrate and a direction to which the gate line 524 is extended is defined as a first direction D1. Particularly, the gate line 524 extended to the first direction D1 is integrally formed with at least one gate electrode 522. The number of the gate electrodes 522 and the gate lines 524 depends on a resolution of the transreflective type LCD. The gate line 524 and the gate electrode 522 apply a turn-on signal to a thin film transistor.

As shown in FIG. 12A, a first image maintaining reflective electrode 526 is formed on the transparent substrate 510 apart from the gate electrode 522 in a predetermined distance. The first image maintaining reflective electrode 526 is used as a first electrode of an image maintaining capacitance for maintaining an image during a frame and as a reflective electrode for reflecting a first light, simultaneously. The first image maintaining reflective electrode 526 is formed in a flat plate shape and has a rectangular frame shape having an opening 526a. The gate line 524 having the gate electrode 522 and the first image maintaining reflective electrode 526 are repeatedly formed on the transparent substrate 510 in accordance with a required resolution. A transparent first insulation thin layer (not shown) is deposited on the transparent substrate 510 on which the gate electrode 522, the gate line 524 and the first image maintaining reflective electrode 526 are formed.

Referring to FIG. 12B, a semiconductor layer (not shown), having properties as an electric conductor and a nonconductor is formed on the first insulation thin layer. The semiconductor layer is patterned to form a channel layer 535 corresponding to the gate electrode 522. The channel layer 535 is formed using an amorphous silicon, a polycrystalline silicon or a single crystalline silicon selectively having the properties as the electric conductor or the nonconductor depending on the formation of an electrical field. Then, a transparent second insulation thin layer is formed on the channel layer 535 and the first insulation layer.

Referring to FIG. 12C, the second insulation thin layer includes first and second contact holes 542a and 544a to partially expose the channel layer 535. A metal thin layer (not shown) for a source and a drain is formed over the second insulation thin layer using a sputtering method. The metal thin layer is patterned using the photolithography process, and a data line 544, a source electrode 542 extended from the data line 544 and a drain electrode 546 are formed on the second insulation layer as shown in FIG. 12C. The data line 544, the source electrode 542 and the drain electrode 546 can be variously formed depending on a design rule of the TFT substrate.

The data line 544 is formed in a second direction perpendicular to the gate line 524 and a plurality of data lines are arranged in parallel. The source electrode 542 extended from the data line 544 is connected with the channel layer 535 through the first contact hole 542a. The drain electrode 546 is connected with the channel layer 535 through the second contact hole 544a and is not overlapped with the first image maintaining reflective electrode 526.

Referring to FIG. 12D, a transparent conductive thin layer (not shown) is formed over the transparent substrate 510. The transparent conductive thin layer is made of an ITO or an IZO. The transparent conductive thin layer is patterned using the photolithography process, to form a transmissive electrode 548 which is electrically connected with the drain electrode 546.

Referring to FIG. 12E, the first light L1 is input upon the first image maintaining reflective electrode 526 through the transmissive electrode 548, and is emitted to the external by being reflected by the first image maintaining reflective electrode 526. A second light L2 generated in the transreflective type LCD is emitted to the external through the opening 526a shown in FIG. 12C. The image maintaining reflective electrode 526 has a size identical with that of the opening 526a.

Figure 13B:
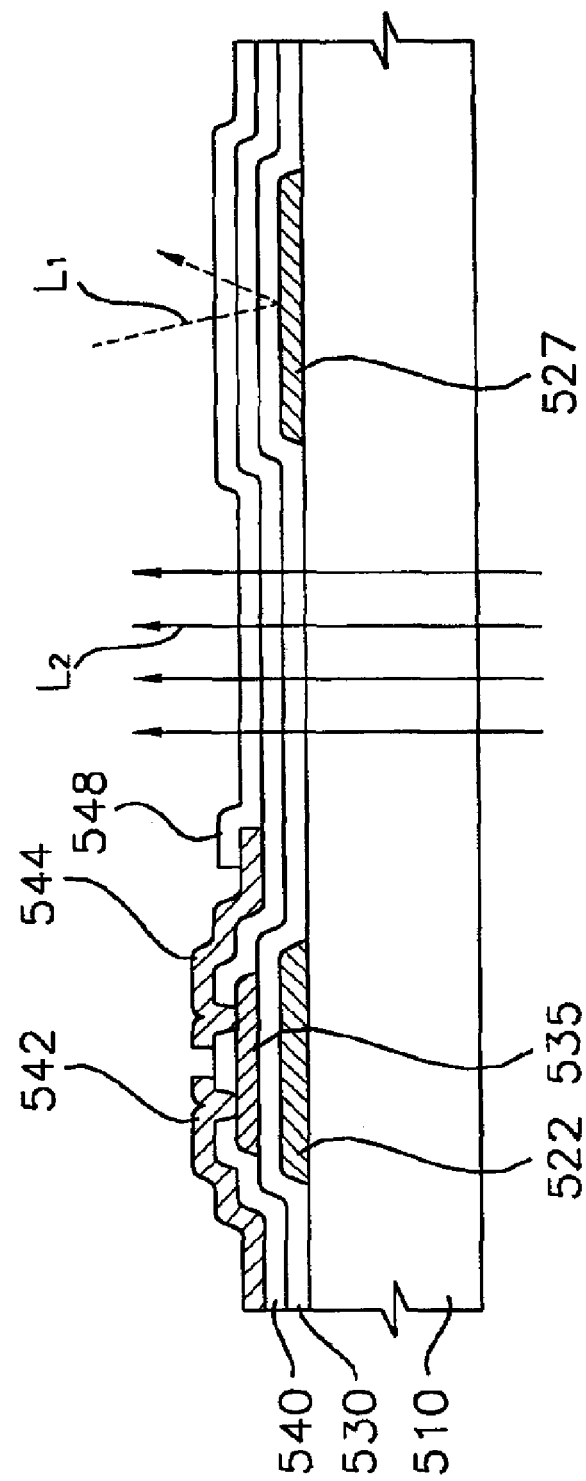

FIGS. 13A and 13B are views showing another TFT substrate according to the third embodiment of the present invention.

Referring to FIGS. 13A and 13B, a second image maintaining reflective electrode 527 having a plate shape is formed on the transparent substrate 510. The second image maintaining reflective electrode 527 is shifted to one side portion of an internal area 527a surrounded by the gate line 524 and the data line 544. Thus, the second image maintaining reflective electrode 527 is partially overlapped with the transmissive electrode 548. The second image maintaining reflective electrode 527 has an area corresponding to an area of a region in which the second image maintaining reflective electrode 527 is not overlapped with the transmissive electrode 548.

FIG. 14 is a view showing a still another TFT substrate according to the third embodiment of the present invention.

Referring to FIG. 14, a third image maintaining reflective electrode 528 is formed on the transparent substrate 510 and disposed in an internal area surrounded by the gate line 524 and the data line 544. The third image maintaining reflective electrode 528 includes a first reflective electrode 528a extended in the first direction D1 and a second reflective electrode 528b extended in the second direction D2. The third image maintaining reflective electrode 528 has a size corresponding to a half of a size of the transmissive electrode 548.

The first to third image maintaining reflective electrodes 526, 527 and 528 can be variously formed in consideration of a ratio of the sizes between the first to third image maintaining reflective electrodes 526, 527 and 528 and the transmissive electrode 548.

According to the transreflective type LCD, the TFT and the pixel electrode connected with the drain electrode of the TFT are formed on the TFT substrate. The pixel electrode includes the transmissive electrode and the reflective electrode having the transmissive window to partially expose the transmissive electrode. The size of the first area of the reflective electrode is smaller than that of the second area of the transmissive electrode exposed through the transmissive window. Thus, differences of the brightness and the color reproducibility between the reflective and transmissive modes are reduced.

Also, the source and drain electrodes are formed through one process and the upper electrode of the image maintaining capacitance is used as the reflection plate for reflecting the first light, so that the number of manufacturing processes of the transreflective type LCD decreases and the thickness thereof is reduced.

Further, the lower electrode for maintaining the image is used as the reflection plate for reflecting the first light, thereby reducing the number of manufacturing processes of the transreflective type LCD and the thickness thereof.

Although the invention is described with reference to exemplary embodiments, it is understood that the present invention should not be limited to these exemplary embodiments but various changes and modifications can be made by one ordinary skilled in the art within the spirit and scope of the appended claims.

What is claimed is:

1. A transreflective LCD for displaying an image in a transmissive mode and in a reflective mode, the LCD comprising:
    a first substrate having a thin film transistor on which a gate electrode, a data electrode and a drain electrode are formed, a transmissive electrode connected to the drain electrode, and a reflective electrode having a transmissive window to expose the transmissive electrode, the reflective electrode having a first area and the transmissive window having a second area, wherein the reflective electrode and the transmissive electrode have a concavo-convex shape, and the transmissive electrode has the concavo-convex shape at an area corresponding to the transmissive window;
    a second substitute having a common electrode and facing the first substrate; and
    a liquid crystal interposed between the first and second substrates.

2. The LCD of claim 1, wherein a ratio of the second area with respect to the first area is determined depending on a reflective efficiency of the reflective electrode such that the higher the reflective efficiency, the larger is the ratio.

3. The LCD of claim 1, wherein the reflective electrode comprises a plurality of transmissive windows.

4. A transreflective LCD comprising:
    a thin film transistor substrate having a plurality of pixels, each of the pixels having a thin film transistor formed an a first surface of a first insulation substrate;
    a lower electrode insulated from the thin film transistor; an upper electrode reflection plate having a first area and being connected with the thin film transistor and facing the lower electrode, and the lower electrode and the upper electrode reflection plate forming an image maintaining capacitance; and a pixel electrode having a transmissive area for transmitting a light emitted from a second surface toward the first surface and receiving a power voltage from the thin film transistor, the pixel electrode being disposed on the upper electrode reflecting plate and connected with the thin film transistor by means of the upper electrode reflecting plate, and the transmissive area having a second area larger than the first area;
    a color filter substrate facing the thin film transistor substrate and having a common electrode facing the pixel electrode, wherein the upper electrode reflection plate reflects light entering via the color filter substrate toward the color filter substrate; and
    a liquid crystal interposed between the thin film transistor substrate and the color filter substrate,
    wherein the upper electrode reflection plate and the pixel electrode have a concavo-convex shape, wherein the pixel electrode has the concavo-convex shape at an area corresponding to the transmissive area.

5. The LCD of claim 4, wherein a size of the second area is less than three times that of the first area.

6. A method for manufacturing a thin film transistor substrate comprising:
    forming a gate line having a gate electrode and a lower electrode on a first surface of a first insulation substrate, the lower electrode being insulated from the gate electrode;
    forming a first insulation layer on the first insulation substrate where the gate line is formed;
    forming a channel layer on the first insulation substrate where the gate electrode is formed;
    forming a data line having a source electrode, a drain electrode and an upper electrode reflection plate for reflecting a light entering through a color filter substrate toward the color filter substrate that is disposed opposite to the first surface, the upper electrode reflection plate being connected with the drain electrode and having a first area, and the lower electrode and the upper electrode reflection plate fanning an image maintaining capacitance;

forming a second insulation layer over the first insulation substrate to expose a portion of the drain electrode; and forming a pixel electrode electrically connected with the drain electrode on the second insulation layer to receive a power voltage from the drain electrode, the pixel electrode including a transmissive area having a second area larger than the first area for transmitting a light emitted from the second surface toward the first surface.

7. The method of claim 6, wherein the upper electrode reflection plate comprises at least one metal selected from the group consisting of an aluminum, a silver, an aluminum alloy and a silver alloy.

8. A transreflective LCD for displaying an image in a transmissive mode and in a reflective mode, the LCD comprising:

a first substrate having a thin film transistor on which a gate electrode, a data electrode and a drain electrode are formed, a transmissive electrode connected to the drain electrode, and a reflective electrode having a transmissive window to expose the transmissive electrode, the reflective electrode having a first area and the transmissive window having a second area, wherein the reflective electrode and the transmissive electrode have a concavo-convex shape, and the transmissive electrode has the concavo-convex shape at an area corresponding to the transmissive window;

a second substrate having a common electrode and facing the first substrate; and a liquid crystal interposed between the first and second substrates;

wherein the second area is larger than the first area to compensate a visual difference between the transmissive and reflective modes.

9. A method for manufacturing a transreflective LCD comprising:

forming a gate line connected to a plurality of gate electrodes and an image maintaining reflection electrode having a first area and insulated from the gate line by patterning a first metal thin layer formed over a first surface of a first transparent substrate;

forming a channel region over the gate electrode;

forming a transparent insulation layer over the first surface, on which first and second contact holes are formed to expose at least two portions of the channel region;

forming a source electrode connected with the first contact hole, a data line connected with the source electrode and a drain electrode connected with the second contact hole by patterning a second metal thin layer, the drain electrode being formed on the transparent insulation layer;

forming a transparent electrode having a second area on the transparent insulation layer and being in contact with the drain electrode on the transparent insulation layer;

disposing a dielectric layer between the image maintaining reflection electrode and the transparent electrode so that an electric charge is stored in the dielectric layer between the image maintaining reflection electrode and the transparent electrode;

assembling a second transparent substrate on which a pixel region of a color filter and a common electrode are formed to face the first transparent substrate; and interposing a liquid crystal between the first and second transparent substrates.

10. The method of claim 9, further comprising forming a transparent insulation layer on the gate electrode before forming the channel region.

11. The method of claim 9, wherein the first area is identical to the second area.

12. A method for manufacturing a transreflective LCD comprising:

forming a gate line connected to a plurality of gate electrodes and an image maintaining reflection electrode having a first area and insulated from the gate line by patterning a first metal thin layer formed over a first surface of a first transparent substrate;

forming a channel region over the gate electrode;

forming a transparent insulation layer over the first surface, on which first and second contact holes are formed to expose at least two portions of the channel region;

forming a source electrode connected with the contact hole, a data line connected with the source electrode and a drain electrode connected with the second contact hole by patterning a second metal thin layer;

forming a transparent electrode having a second area and being partially overlapped with the drain electrode and connected with the drain electrode by patterning a transparent conductive thin layer formed over the first surface, wherein the overlapped area between the transparent electrode and the drain electrode is spaced apart from the image maintaining reflection electrode;

disposing a dielectric layer between the image maintaining reflection electrode and the transparent electrode so that an electric charge is stored in the dielectric layer between the image maintaining reflection electrode and the transparent electrode;

assembling a second transparent substrate on which a pixel region of a color filter and a common electrode are formed to face the first transparent substrate; and interposing a liquid crystal between the first and second transparent substrates.

13. The method of claim 12, further comprising forming a transparent insulation layer on the gate electrode before forming the channel region.

14. The method of claim 12, wherein the first area is identical to the second area.

* * * * *